May 23, 1933.   R. M. LOVEJOY   1,911,025
FLUID OPERATED CONTROL FOR MULTISPINDLE DRILLS
Filed April 3, 1930   10 Sheets-Sheet 1

Inventor.
Ralph M. Lovejoy
by Heard Smith & Tennant
Attys.

May 23, 1933.   R. M. LOVEJOY   1,911,025
FLUID OPERATED CONTROL FOR MULTISPINDLE DRILLS
Filed April 3, 1930   10 Sheets-Sheet 3

Inventor.
Ralph M. Lovejoy
by Heard Smith & Tennant.
Attys.

May 23, 1933.  R. M. LOVEJOY  1,911,025
FLUID OPERATED CONTROL FOR MULTISPINDLE DRILLS
Filed April 3, 1930  10 Sheets-Sheet 4
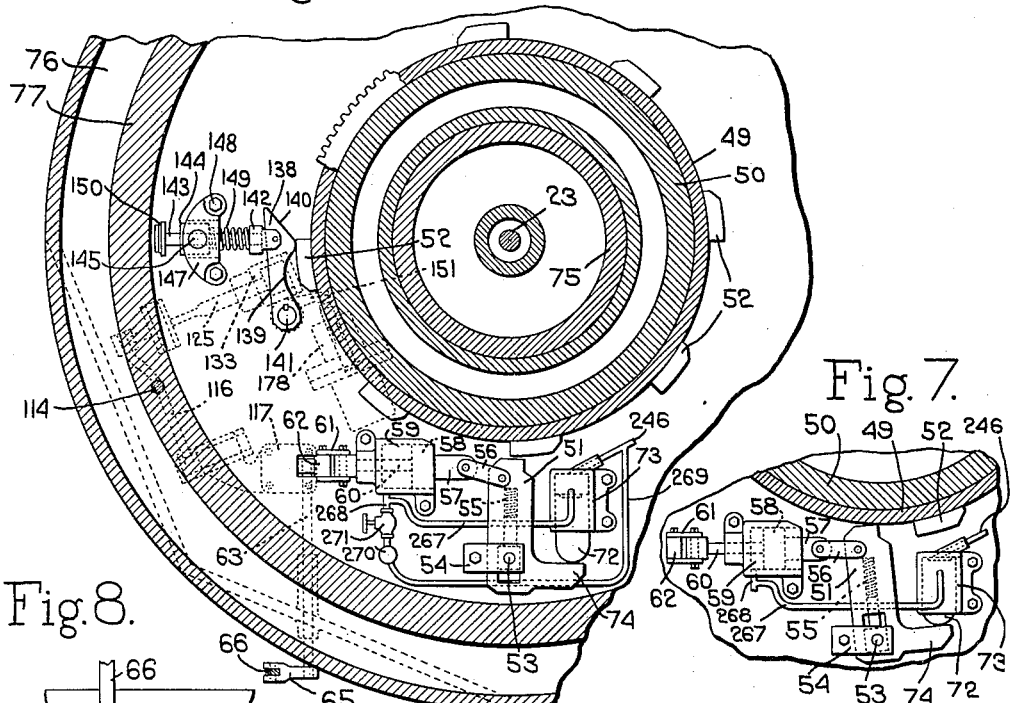
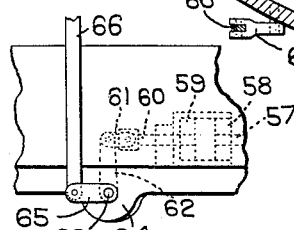
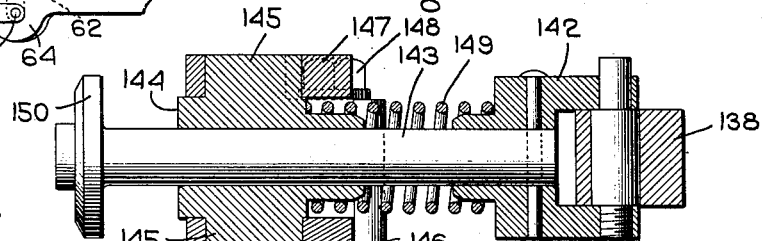
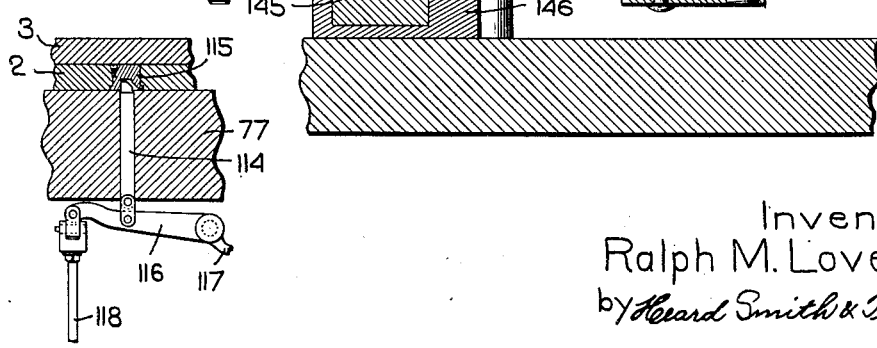
Inventor.
Ralph M. Lovejoy
by Heard Smith & Tennant.
Attys.

May 23, 1933. R. M. LOVEJOY 1,911,025
FLUID OPERATED CONTROL FOR MULTISPINDLE DRILLS
Filed April 3, 1930 10 Sheets-Sheet 5

Inventor.
Ralph M. Lovejoy
by Heard Smith & Tennant.
Attys.

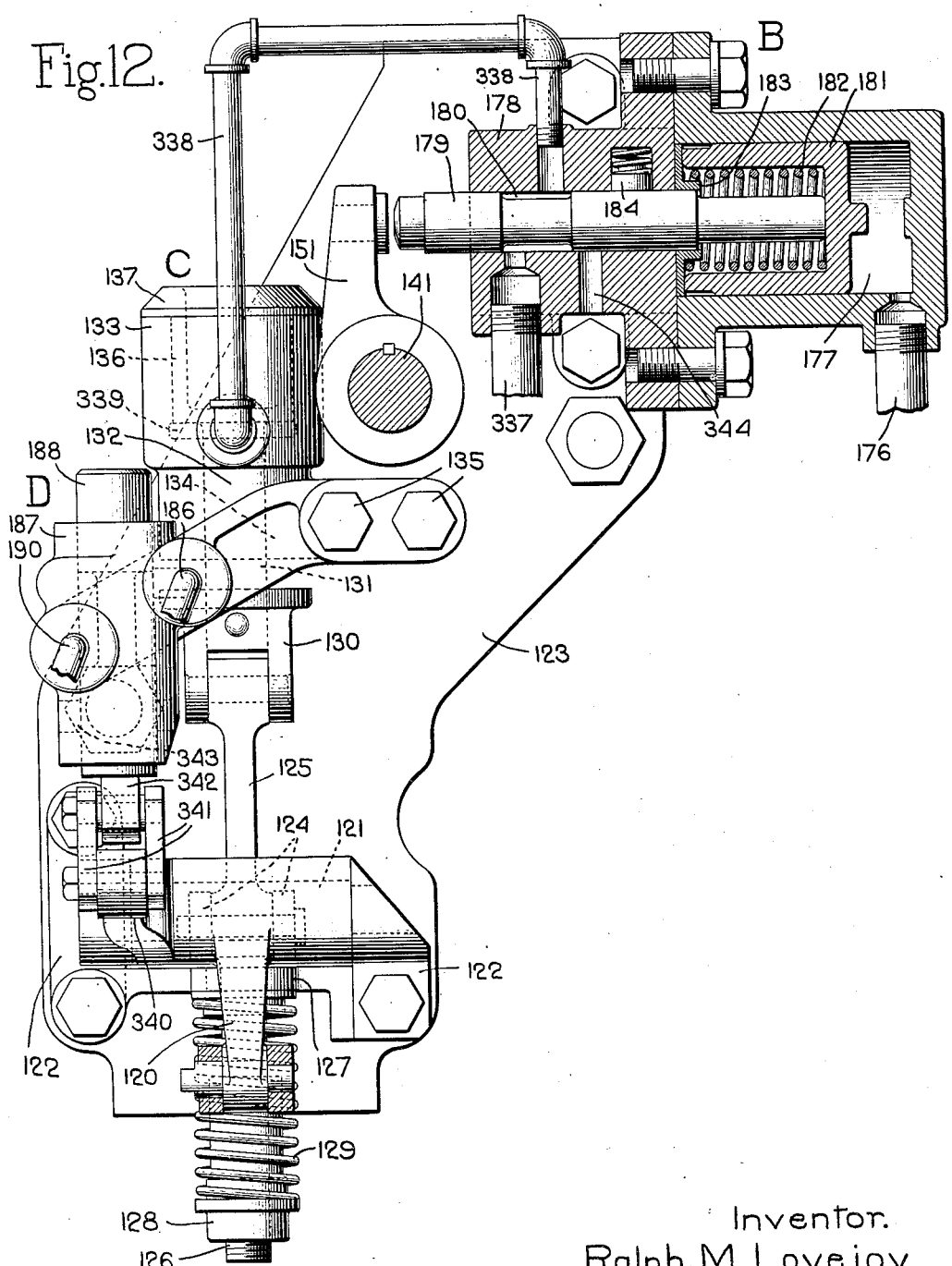

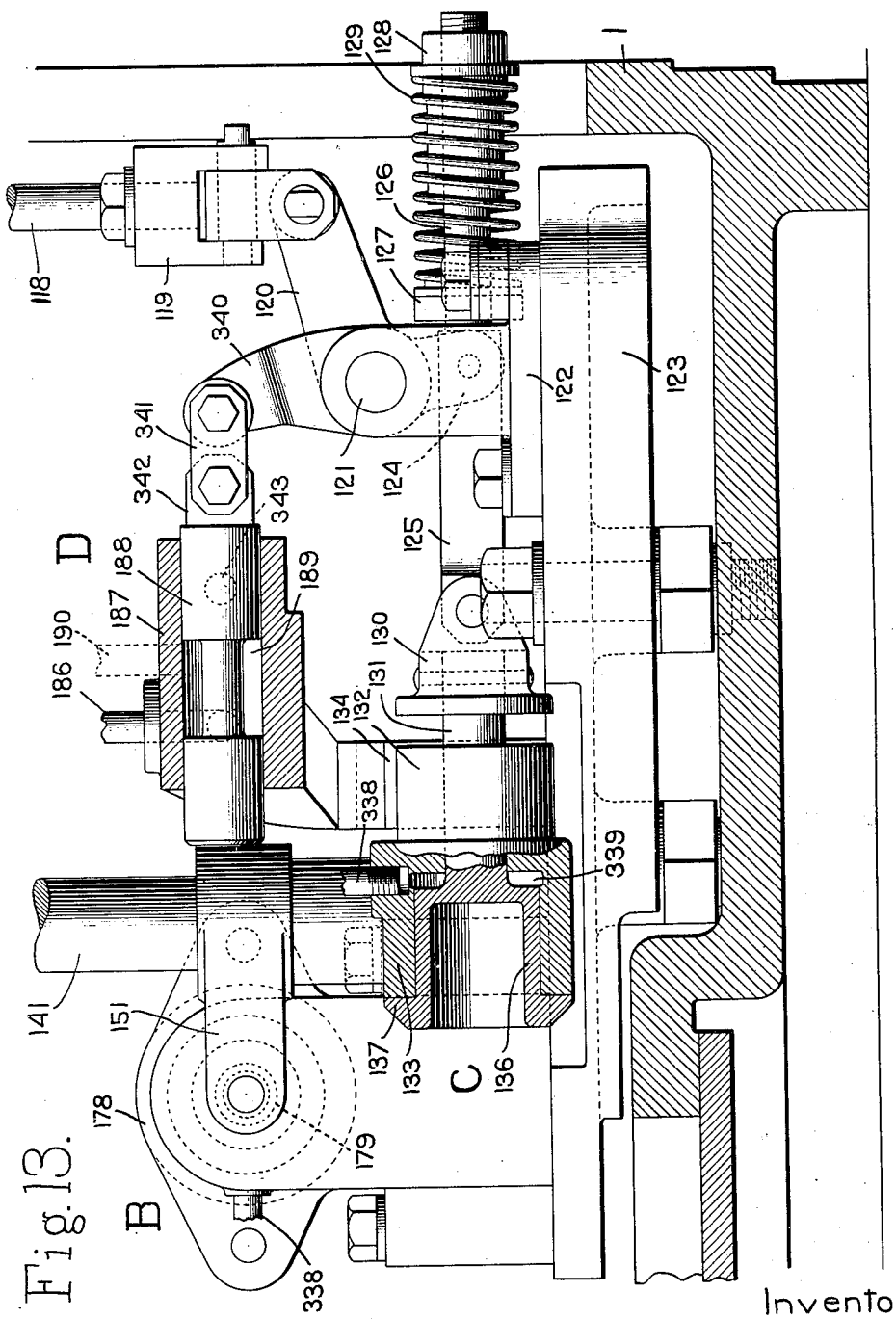

May 23, 1933. R. M. LOVEJOY 1,911,025
FLUID OPERATED CONTROL FOR MULTISPINDLE DRILLS
Filed April 3, 1930 10 Sheets-Sheet 8
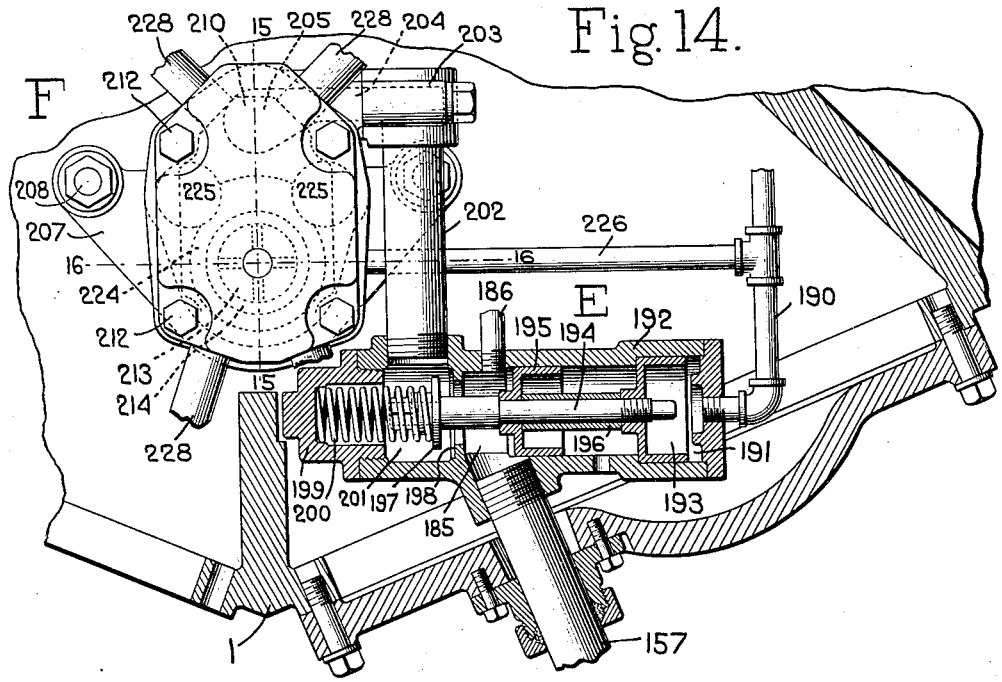
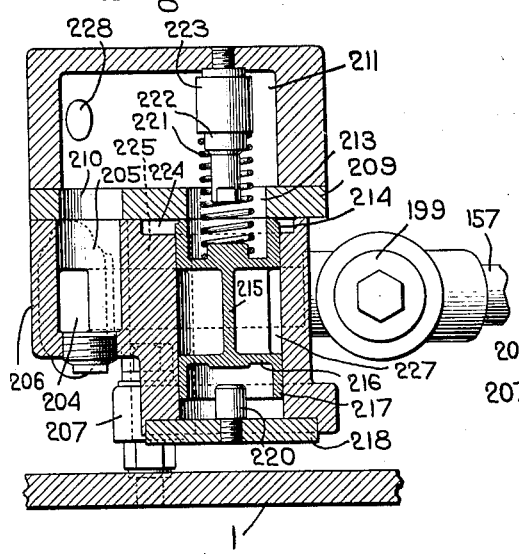
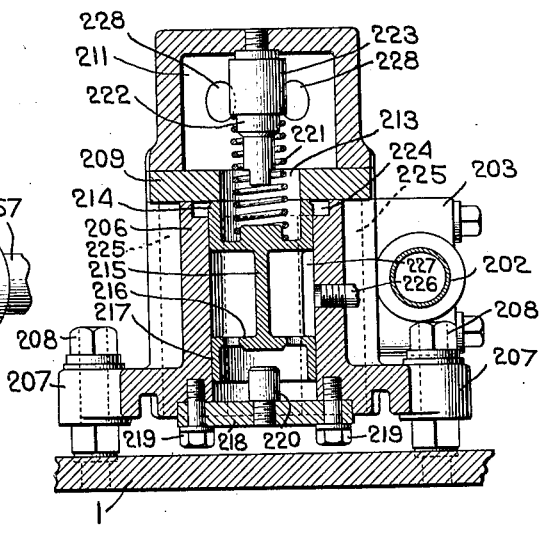
Inventor.
Ralph M. Lovejoy
by Heard Smith & Tennant
Attys.

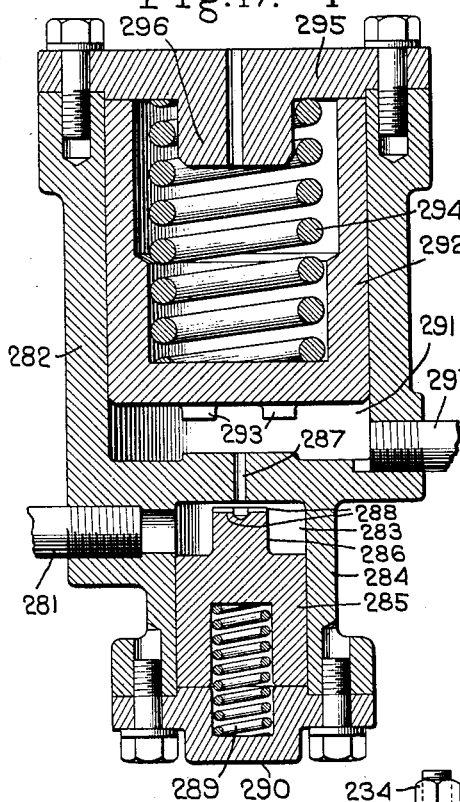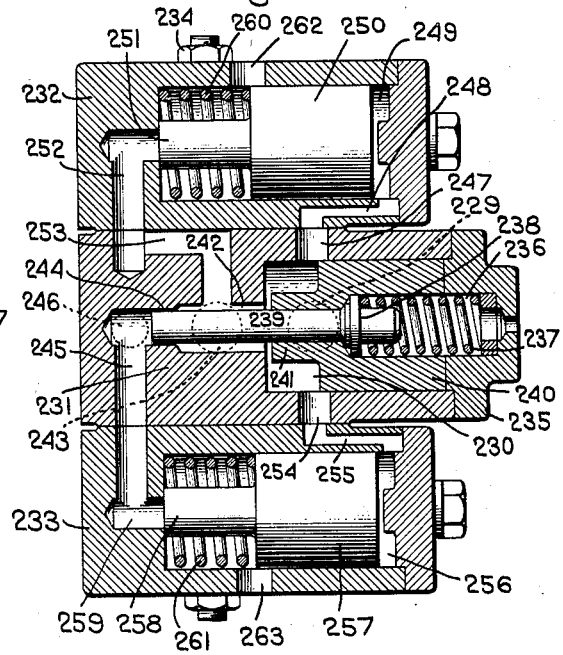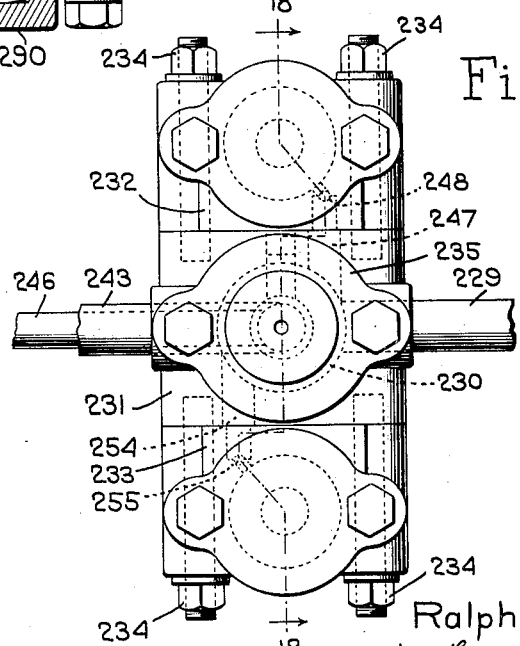

May 23, 1933. R. M. LOVEJOY 1,911,025
FLUID OPERATED CONTROL FOR MULTISPINDLE DRILLS
Filed April 3, 1930 10 Sheets-Sheet 10
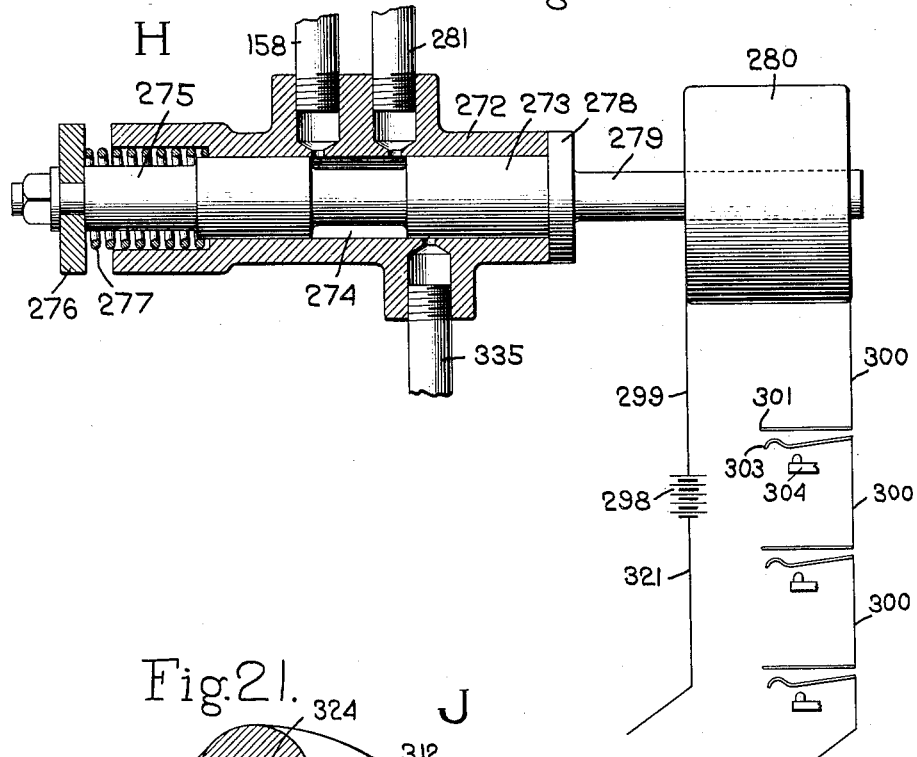
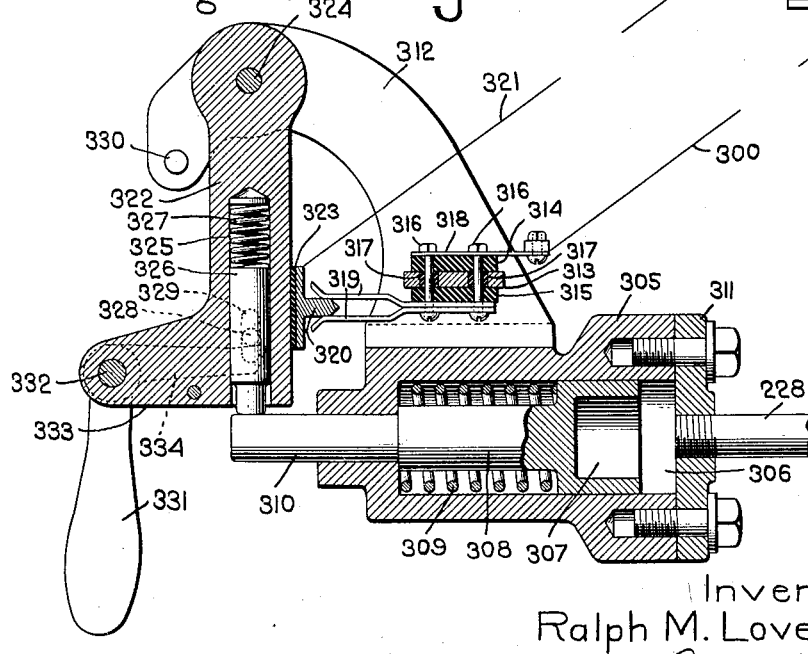
Inventor.
Ralph M. Lovejoy
by Heard Smith & Tennant
Attys.

Patented May 23, 1933

1,911,025

UNITED STATES PATENT OFFICE

RALPH M. LOVEJOY, OF BOSTON, MASSACHUSETTS

FLUID OPERATED CONTROL FOR MULTISPINDLE DRILLS

Application filed April 3, 1930. Serial No. 441,387.

This invention relates to improvements in automatic drilling machines, and machines for other purposes, in which the work is carried by a travelling carrier successively to a plurality of stations, at certain of which it is operated upon by a tool, such as a drill, a countersink, a reamer, or other suitable tool, and in which the operations of various parts are effected by controlling mechanisms responsive to the energization or de-energization of a fluid medium.

More particularly the invention relates to improvements in drilling machines and machines of like character of the type disclosed in my prior application for Patent Serial Number 171,316, filed February 26, 1927, for Drilling machines and machines for other purposes, which comprises a travelling carrier for the work, means for actuating the same to present the work successively at a plurality of tool stations, tools at said stations, means for feeding the tools to and from the work, means for arresting the work carrier with the work at said stations, means for locking the carrier at said stations, means for releasing said locking means, and means automatically operable by the means for arresting the movement of the travelling carrier to render inoperative the means for actuating the carrier, with fluid-controlled means for automatically effecting and determining the sequence of such operations.

The construction specifically disclosed in my prior application comprises a fluid-control in which a continuous circulation of fluid is maintained, with means for cutting off or restricting the flow of fluid through certain conduits for the purpose of energizing the same by the building up of fluid pressure and utilizing said pressure to effect certain operations and by the release of pressure in certain conduits to effect certain other operations of the parts.

The present invention relates to further improvements upon said construction in which the restriction of fluid under pressure is caused to build up pressure to perform certain operations, the by-passing of the fluid under pressure to perform other operations, and particularly the actuation of means for releasing the fluid under pressure upon mechanisms actuated thereby.

The present invention further contemplates the provision of various safety mechanisms operable to prevent improper actuation of different parts of the machine.

The invention further contemplates the provision of fluid-retarding mechanisms operable to delay the action of certain mechanisms to insure the proper sequence of operation.

More specifically one of the objects of the invention is to provide a machine of the character above described with automatically operable means for preventing the operation of the means for actuating the travelling carrier unless and until all of the tools have been moved a predetermined distance from the work.

Another object of the invention is to provide means for automatically preventing the actuation of means for locking the travelling work carrier unless the work is approximately positioned properly at the several stations.

A further object of the invention is to provide means for preventing the actuation of the tool-feeding means unless and until the work is properly positioned at the tool station and locked in such position.

A further object of the invention is to provide means for delaying the actuation of the tool-feeding mechanism until the locking of the work carrier is completed.

Another object of the invention is to provide a machine having a travelling work carrier with means for arresting the carrier with the work approximately positioned at the tool station and having means for locking the work carrier with novel means for releasing the carrier-arresting means, and means for delaying the release and restoration of such carrier-arresting means to normal position until the locking of the carrier is completed.

Another object of the invention is to provide a machine of the class described having automatically operable means for actuating the travelling carrier upon release of the carrier-locking means and arrest of the tool-feeding means, with means for delaying the actuation of the travelling carrier until completion of the unlocking of the carrier and stoppage of the tool-feeding means is insured.

Another object of the invention is to provide manually operable means which will enable the operator, after having secured the work to the travelling carrier at a loading station, to condition the controlling means so that it will automatically operate the necessary parts to index the travelling carrier to lock the same and actuate the tool-feeding mechanism, thereby permitting the operator to leave the machine after he has secured the work upon said carrier, and a further object of the invention is to provide means for releasing said manually operable controlling means upon actuation of the locking means and thereby to prevent further operation of the indexing mechanism upon completion of the operation of the tools upon the work unless said manual controlling means is restored to operative position by the operator.

Another object of the invention is so to co-ordinate fluid-actuated controlling devices for establishing fluid under pressure upon various controlling mechanisms for by-passing fluid under pressure and for releasing fluid under pressure upon such mechanisms as will insure proper sequence of the operations of the carrier-actuating mechanism, the carrier-arresting mechanism, the locking mechanism, and the tool-feeding mechanism.

These and other objects and features of the invention will more fully appear from the following description and the accompanying drawings and will be particularly pointed out in the claims.

In the drawings:

Fig. 6 is a broken-away, horizontal, sectional view on line 6—6, Fig. 5, illustrating particularly the work-carrier arresting mechanism and the mechanism for controlling the main pressure cut-off, the locking mechanism for the work supports being omitted;

Fig. 7 is a smaller but similar detail sectional view illustrating the work-carrier arresting mechanism removed from locking position;

Fig. 8 is a detail view of a portion of the mechanism which is operated by the movement of the work-carrier arresting mechanism to release the work-carrier driving mechanism;

Fig. 9 is a detail view, mainly in vertical section, of the work-carrier and the feeler mechanism co-operating therewith;

Fig. 10 is a detail view, mainly in vertical section, of the spring-actuated mechanism for restoring the main pressure cut-off to normal position;

Fig. 12 is a view, partially in horizontal section, but mainly in plan, illustrating the by-pass valve, the table feeler control, and the main pressure cut-off;

Fig. 13 is a view, partially in vertical section, and partially in side elevation, showing the table feeler control and the main pressure cut-off;

Fig. 14 is a view, partially in horizontal section and partially in elevation, showing the main admission valve and the distributor associated therewith;

Fig. 15 is a vertical sectional view of the distributor and valve for controlling the same, on line 15—15, Fig. 14;

Fig. 16 is a vertical sectional view through the distributor and valve mechanism therefor, on line 16—16, Fig. 14;

Fig. 17 is a vertical sectional view of the retarder for the table drive control;

Fig. 18 is a view, mainly in vertical section, of the retarder for the tool driving control and for the table-arresting mechanism control on line 18—18, Fig. 19;

Fig. 19 is an end elevation of the construction illustrated in Fig. 18, viewed from the right toward the left;

Figure 1:
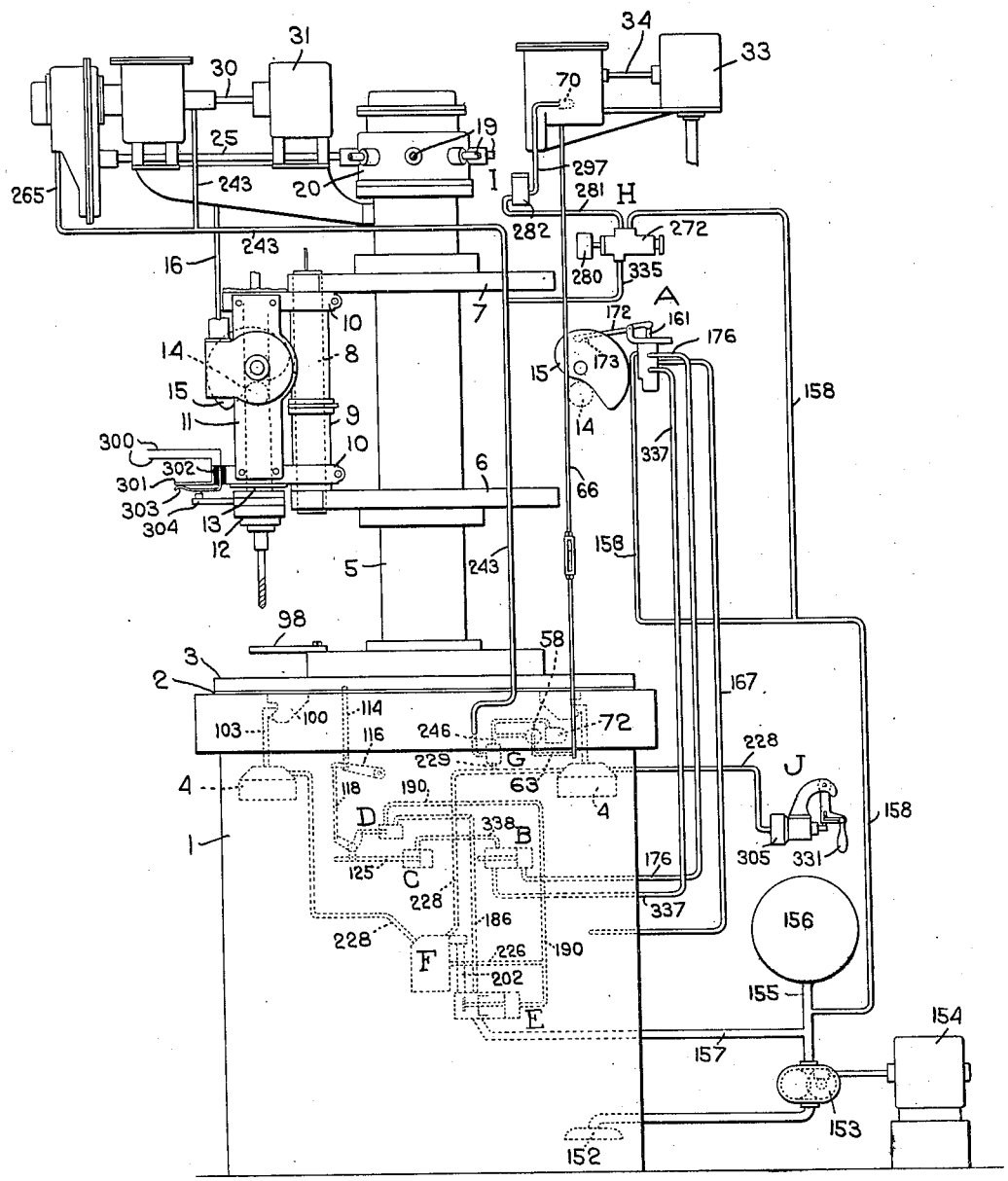
Fig. 1 is a general view, mainly in diagrammatic form, of the drill embodying the invention, a single drilling unit being shown, this figure being more particularly illustrative of the controlling mechanism.

Fig. 20 is a view partly in vertical section of an electrically operated safety valve showing also the solenoid, a portion of the electric circuit leading thereto, and certain of the switches operable by the movement of the tools away from the work to complete the circuit; and, Fig. 21 is a view, partly in vertical section, of the manually operable safety switch for completing the circuit of the solenoid of the electrically operated safety valve shown in Fig. 20.

A preferred embodiment of the invention is illustrated herein as applied to a drilling machine of the type disclosed in my prior application Serial Number 171,316 filed February 26, 1927, for Drilling machines and machines for other purposes, which is designed to perform successively a series of operations upon work pieces supported upon an intermittently movable carrier. Much of the construction of the present machine is identical with, or similar to, that disclosed in said prior application, and detail illustration and description of such mechanisms is, therefore, unnecessary.

The construction illustrated comprises a heavy hollow base 1, desirably of cylindrical form, which provides a reservoir for oil or other suitable fluid. A travelling carrier, in the form of a rotatable table 2, is mounted upon said base and carries a plurality of independent work-supporting members 3, preferably in the form of flat sectors which are slidably supported upon the table 2 and are movably relatively thereto both radially and circumferentially. Fluid-operated positioning means 4 carried by the base are provided at each tool station and are operable to position, and preferably also to lock, the work-supporting sectors accurately in a predetermined position at each tool station irrespective of any inaccuracy of the correct position of the travelling carrier.

A hollow central column 5 is mounted upon the base and is provided with spaced-apart plates 6 and 7 having hubs which are fixedly secured to the column 5. Hollow vertical posts 8, corresponding to the number of tool stations and located at uniformly separated intervals, preferably extend through and are secured to the plates 6 and 7 near their peripheries. Sleeves 9, which desirably are bored eccentrically, are rotatably mounted upon these columns between the plates 6 and 7 and provide supports for the frames of the respective tool carriers. By rotating the sleeves upon their respective posts, the position of the tool-supporting frame may be adjusted to center the tool accurately with respect to the work. Upper and lower brackets having semi-cylindrical sections 10 clamped upon the sleeves 9 support the tool-carrying frame 11.

The tool, which may be a drill, reamer, or other device, is mounted in a chuck 12 which is connected to the end of a rotatable spindle which desirably is driven by an independent motor and is rotatably mounted within a sliding member 13 reciprocably mounted in said tool-carrying frame 11.

*The tool-feeding mechanism*

The sliding member 13 is provided with a laterally extending stud or roll 14 which is engaged by a tool-feeding cam 15 mounted upon the frame 11. The tool-feeding cam is actuated through a worm gear which is secured to the cam or the cam shaft and is engaged by a worm having a preferably vertical shaft 16. The upper end of the shaft 16 is provided with a beveled pinion 17 meshing with a complementary pinion 18 upon a shaft 19, preferably formed in alined sections connected by a universal joint, and journalled in a bearing in a housing 20 mounted upon the upper end of the column 5. The shaft 19 is provided with a beveled pinion 21 which engages a beveled ring gear 22 which is rotatably mounted upon a vertical shaft 23, through which rotative movement is transmitted to the rotating table as will hereinafter be described.

The ring gear 22 is engaged by a beveled pinion 24 upon a shaft 25 having upon its opposite end a gear 26 which is driven by a pinion 27 upon the shaft 28 adapted to be connected by a fluid-operated clutch 29 to the shaft 30 of a motor 31.

The tool-feeding construction illustrated is substantially identical with that disclosed in my prior application aforesaid and detail description of the fluid-operated clutch 29 and the co-operating fluid-operated brake 32 is unnecessary.

It will be understood that the power transmitted from the motor through the fluid-actuated clutch and the shaft 25 rotates the ring gear and that countershafts 19 extend radially from the casing 21 to operate each of the tool-feeding cams of the machine.

*The table-rotating mechanism*

The rotating table is actuated by a motor 33 having a shaft 34 provided with a clutch member 35 which engages a complementary clutch member 36 upon a shaft which is coaxial with the shaft 34 and is provided with a pinion 37 which engages a gear 38 upon a shaft 39 formed in sections connected by a universal joint and provided with a beveled pinion 40 which engages a complementary gear 41 upon the vertical shaft 23 which is mounted in suitable bearings in the housing 20 to extend axially of the column 5.

The shaft 23 has at its lower end a beveled pinion 42 which meshes with a complementary beveled pinion 43 upon a countershaft 44, preferably formed in axially alined sections, with a universal coupling therebetween, and provided at its opposite end with a beveled pinion 45 which engages a beveled pinion 46 of a vertical shaft 47, the upper end of which is provided with a gear 48 which meshes with a ring gear 49 which is secured to a boss 50 integral with and extending downwardly from the underside of the rotating table 2.

This table-rotating construction may be and desirably is substantially the same as that disclosed in my prior application Serial Number 171,316 above identified and means for actuating the clutch together with fluid-operated means for maintaining the clutch members out of engagement during the operation of the tools may be and desirably is the same as that disclosed therein.

The table-arresting mechanism

Inasmuch as the rotating table, the work supports, and the work carried thereby are of great weight and when under motion acquire considerable momentum, it is desirable that means shall be provided for cushioning the stoppage of the table, thereby preventing undue jar and avoiding the likelihood of overthrow or rebound which might occur by the sudden stoppage of the table.

In the present construction a reciprocating and sliding stop 51, (see Figs. 6 and 7) is provided which has a shouldered end adapted to be positioned in the path of blocks 52 fixedly secured upon the depending flange of the ring gear 49 which rotates the table. The stop 51 is provided at its opposite end with a longitudinal slot which is traversed by a pin 53 which is pivotally mounted upon a bracket 54 secured to the upper wall of the base 1.

A helical spring 55, seated in the cylindrical longitudinal bore in the stop 51, abutting at one end against the pin 53 and at its opposite end against the end of the slot, tends normally to force the stop 51 away from its pivotal support into position to engage the blocks 52. A link 56 is pivotally connected at one end to the stop 51 and at its opposite end to the stem 57 of a piston 58 which is slidably mounted in a cylindrical chamber 59 of a dash pot which is secured to the base 1.

Suitable means are provided for introducing fluid under pressure into the chamber 59 of the dash pot and for permitting the same to escape therefrom gradually during the arresting of the table. The piston 58 is also provided with another stem 60 which passes through the opposite end of the dash pot and is connected by links 61 to the vertical arm 62 of a rock shaft 63 which is journalled in a suitable bearing 64 in the vertical wall of the base.

The rock shaft 63 extends through the base and is provided at its outer end with an arm 65 which is pivotally connected to a vertical link 66, the upper end of which is connected to the arm 67 of a rock shaft 68 having a yoke 69 engaging a groove in the hub of the clutch member 36 of the table-driving mechanism. The link 66 desirably is formed in axially alined sections connected by a turn-buckle to permit adjustment of the length of the link.

When, in the operation of the machine, the clutch members 35 and 36 are engaged, the motor 33 will drive the shaft 34, the gears 37 and 38, the shaft 39, gears 40 and 41, the vertical shaft 23 which extends axially through the central column, thereby rotating the gear 42 which engages the gear 43 and drives the countershaft 44, the gear 45 of which engages the gear 46 upon the shaft 47, thereby causing the gear 48, which engages the gear 49 upon the table to rotate the table. When, during the rotation of the table a block 52, which is secured to the table gear 49, engages the stop 51 it will swing the stop about its axis, to the left from the position illustrated in Fig. 6, thereby forcing the piston 58, to the left, against the cushioning effect of the dash pot 59, thus gradually arresting the rotation of the table.

As the piston 58 moves, to the left, it swings the arm 62 of the rock shaft 63 to the left, thereby causing the arm 65 of said rock shaft to move downwardly, thereby drawing down the link 66, thus swinging the arm 67 of the rock shaft 68 downwardly and causing the yoke 69 to move the clutch member 36 out of engagement with the clutch member 35 on the motor shaft, thus interrupting the drive of the table-actuating motor 33. An hydraulically operated piston 70, which engages another arm 71 upon the rock shaft 68, is operated at this time, in a manner hereinafter to be described, to insure disengagement of the clutch members 35 and 36 during the operation of the drilling mechanism and until released by the fluid-actuated controlling mechanism.

When the table has been rotated to proper indexing position, it is positively locked in such position by a fluid-actuated mechanism and thereafter fluid-actuated means are provided for withdrawing the stop 51 from engagement with the block 52 and retaining it in withdrawn position until the completion of the operation of the tools.

The means for thus withdrawing the stop 51 comprises a plunger or piston 72 (Fig. 6) which is slidably mounted in a fixed cylinder 73 which receives fluid under pressure, the end of the plunger 72 engaging an arm 74 extending laterally from the lower outer end of the stop 51.

When fluid pressure is introduced into the cylinder 73, the stop 51 is forced outwardly against the spring 55 and also swung pivotally into the position illustrated in Fig. 6, thereby withdrawing it from the path of the stop 51 to permit further rotation of the table. Upon release of pressure in the cylinder 73, the spring 55 restores the stop 51 into the path of the block 52, as illustrated in Fig. 7, thereby positioning it to engage and gradually to arrest the rotation of the table during the next indexing operation.

Figure 5:
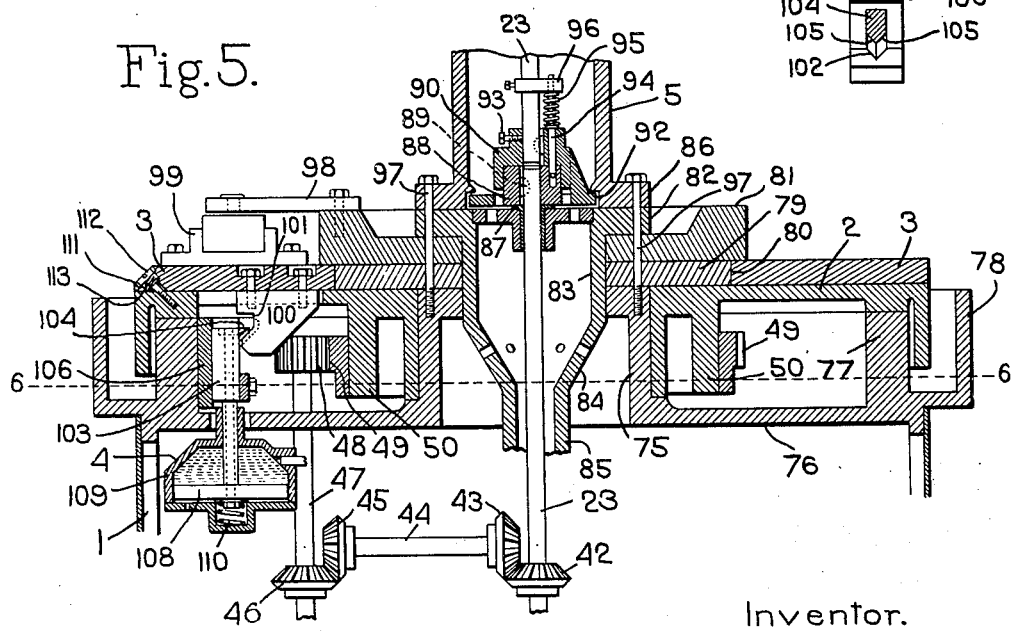
Fig. 5 is a detail vertical sectional view illustrating particularly the hydraulically operated positioning and locking mechanisms for one of the work-supported members.

The rotating table, the support therefor, and the work-supporting sectors which are slidably carried by the table, are illustrated more particularly in vertical section in Fig. 5 which shows the table 2 as provided with a downwardly extending boss 50 rotatably mounted upon a complementary hollow boss 75 extending upwardly from and integral with the upper wall 76 of the base 1. The upper portion of the base desirably also is provided with an integral ring 77 which is surfaced at its upper edge to provide a seat for the thickened periphery of the rotatable table 2 which desirably has an apron extending downwardly around the ring 77 to prevent dust, chips, etc., from entering between the contacting surfaces of the table and ring.

The base also desirably is provided with an outer flange 78 which extends around the depending flange of the table. The upper end of the boss 75 of the base is flat and has secured to it a plate 79 which is provided with an accurately finished cylindrical periphery 8 adapted to be engaged by complementary finished surfaces upon the inner ends of the work-supporting sectors 3. A circular plate 81 rests upon the plate 79 and is of larger diameter than that of the plate 79 so that it extends over the periphery thereof and thus overlies the inner ends of the work-supporting sectors 3.

A hollow bearing housing comprising a flange 82, which rests upon the plate 79, and a cylindrical portion 83, which extends downwardly through the central apertures in the plates 81 and 82 and the upper surfaced end of the boss 75, is provided with a downwardly tapering portion 84 having ports communicating with the reservoir in the base and a lower cylindrical portion 85 to which a housing is connected for the lower end of the table-driving shaft 23 providing a step bearing for the shaft and also enclosing the gears 42 and 43. The column 5 is provided at its lower end with a flange 86 which rests upon and desirably may be of the same diameter as the flange 80 of the hollow bearing housing.

For convenience in assembling, the shaft 23 is made in axially alined sections, the upper end portion of the lower section being journalled in a bushed bearing in a spider 87 which is seated in the countersink in the upper end of the bearing housing. A block 88 is secured to the upper end of the lower shaft section by a feather 89 and rests upon the bushing in the spider 87. The lower end of the upper section of the shaft 23 has a fitting secured to it comprising a hub 90 from which ribs 91 extend downwardly and outwardly and merge into a horizontal flange 92 which is rotatably mounted in a countersink in the lower end of the column 5.

The hub 90 of the fitting is secured to the lower end portion of the shaft by one or more set screws 93, or in any other suitable manner. The hub 90 of the housing is provided with a vertical bore in which a large pin 94 is slidably mounted and which is adapted to engage a complementary recess in the block 88. A spring 95, interposed between the upper end of the pin 94 and the bracket 96, fixedly secured to the shaft 23, serves to force the pin normally into engagement with the recess in the block 88.

In the assembling of the machine, the spider 85 is slipped over the upper end of the lower section of the shaft 23 and seated in its countersink in the bearing housing. The bracket 96, with its spring pressed pin and fitting 94, are secured to the lower end portion of the upper section of the shaft. When the column is erected and its flange 86 superimposed upon the flange 82 of the bearing housing, the pin 94 may engage the socket in the block 88 or may rest upon the top of the block. In the latter case a partial revolution will bring the pin 94 into registry with its socket and the spring 95 will force it therein, thereby locking the sections of the shaft together in operative position. When the column is then erected it is secured firmly to the bed by bolts 97 which pass through the flange of the column, the flange of the housing, the plates 81 and 79, into the vertical walls of the boss 75 in which they are anchored by screw threaded connection. Thus the bolts 97 secure and clamp all of these parts rigidly together.

The plate 81 desirably is provided with a relatively thick annular edge portion to which tool guides 98 are secured. Jigs 99 for the work are bolted, or otherwise secured, to the work-supporting sectors 3 in the usual manner.

*The positioning and locking mechanism for the work-supporting members*

Figure 3:
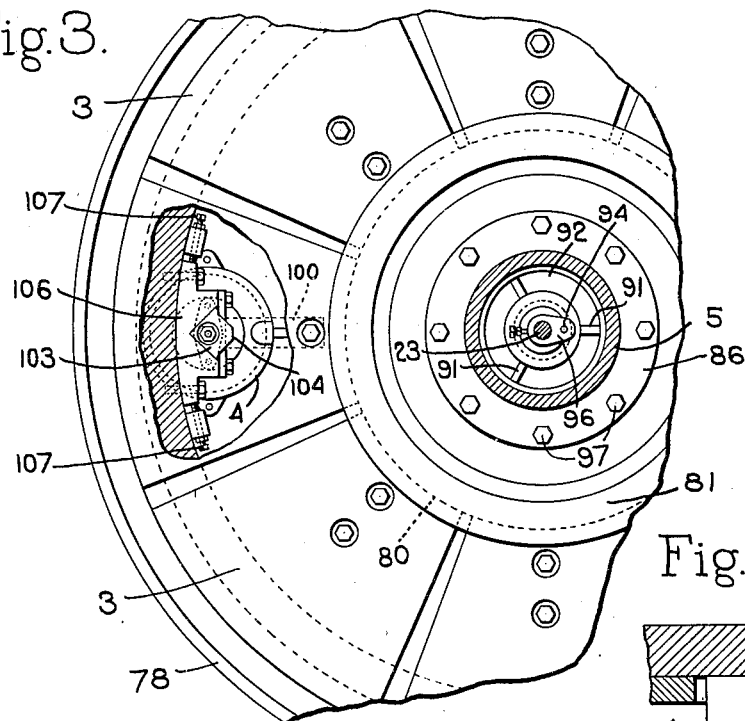
Fig. 3 is a detail plan view of a portion of the rotating table with the work-supporting members mounted thereon and broken away to illustrate the mechanism for positioning and locking one of the work-supporting members.
Figure 4:
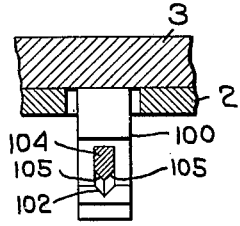
Fig. 4 is a horizontal sectional view of the sector-locking and positioning mechanism.

The positioning and locking mechanism for the work-supporting members is illustrated in detail in Figs. 3, 4, and 5 of the drawings, and comprises co-operating members mounted respectively on the work-supporting sectors 3 and upon the base at the several tool stations, with fluid-operated means, preferably hydraulic, for actuating the members which are upon the base to cause the same to engage, position and lock the sectors accurately in predetermined position at the respective stations. By providing individual locking mechanisms of this character at each station, absolute accuracy in the positioning of the work-supporting members at the respective stations is insured. Inasmuch as all the locking mechanisms at the several stations are identical the description of one will be sufficient for all.

The preferred form of locking mechanism illustrated in Figs. 3, 4, and 5, comprises a block 100 which is bolted to the under face of the work-supporting sector 3 and extends downwardly through a suitable aperture in the rotating table 2. This block is provided with a re-entrant recess 101, the under face of which presents a V-shaped downwardly and upwardly inclined groove 102.

The complementary member comprises a vertically reciprocating clamping slide or positioning plunger 103 having a laterally projecting nose 104 the under face of which is provided with downwardly inclined faces 105 complementary to the walls of the V-shaped groove 102. The vertically reciprocable clamping slide or positioning plunger is mounted in suitable ways in a bearing 106 having a curved peripheral surface complementary to the inner face of the flange 77 which extends upwardly from the base. The bearing 106 is secured to the flange by suitable bolts extending through slots and flanges in the bearing, see Fig. 3. Preferably adjusting screws 107, mounted in suitable bosses which are secured to the inner wall of the flange 77 and which engage at their ends opposite sides of the bearing 106, are provided to enable the position of the bearing 106, and consequently the position of the vertically reciprocable clamping slide or positioning plunger, to be accurately adjusted. The lower end of the clamping slide 103 is rigidly connected to a piston 108 which is reciprocably mounted in the cylindrical portion of an oil-containing casing 109 of the fluid-operated positioning means 4. The casing 109 desirably is secured to the upper wall 76 of the base by suitable supporting means (not shown). A spring 110, interposed between the piston 109 and the head of the casing, serves normally to raise the piston and clamping slide, thus removing the nose 104 thereof from engagement with the V-shaped groove 102.

When fluid under pressure is introduced into the chamber of the casing 109, as will hereinafter be described, the piston 108 will be forced downwardly, thereby causing the inclined faces 105 of the nose 104 of the slide 103 to engage the complementary V-shaped walls of the recess 102 in the block 100 and forcing the sector radially inwardly and causing its finished inner edge to engage the complementary finished outer edge 80 of the plate 79. The engagement of the complementary inclined V-shaped faces of the nose upon the plunger or slide and those of the groove 102 serves not only to force the sector 3 inwardly, but also to move it circumferentially if necessary to an absolutely correct position and then to lock the sector tightly down upon the rotating table, thereby insuring and maintaining the accurate positioning of the sector with respect to the position of the tool irrespective of the correct positioning of the rotating table.

In order to retain the sectors upon the table in approximately the proper position, each sector is provided adjacent its edge with an inclined slot 111 through which a bolt 112 extends into the table 2, a spring 113 desirably being interposed between the head of the bolt and the countersink of the work-supporting sector.

By reason of this construction the work-supporting sector is maintained in approximately its proper position to the table although movable with relation thereto and the table-positioning and locking members are so constructed and arranged as to correct any improper positioning of the sector when in its locked position irrespective of any displacement thereof upon the table or any inaccuracy in the indexing movement of the table itself.

The table-actuating and tool-feeding and actuating mechanisms above described may be and are substantially the same in principle as those disclosed in my prior application Serial Number 171,316 above identified. In the prior application fluid-operated means, preferably hydraulic, were described for controlling the actuation of these various mechanisms. In the present construction fluid-operated controlling means are also provided which operate in a somewhat similar manner to those disclosed in the prior application, but which are provided with various mechanisms for controlling the action of the fluid under pressure to insure the proper timing of the operations of the various instrumentalities and prevent improper operation thereof. One of these mechanisms comprises a feeler adapted during the rotation of the table to engage the lower face thereof and when the table is indexed to approximately the proper position to enter a socket in the table, the mechanism operated by the finger being so constructed as to prevent the admission of fluid under pressure to the table-locking mechanism until the finger enters the recess in the table.

A further safety mechanism comprises means operable by the table during its rotation to release the fluid under pressure which withdraws the feeler finger from the socket in the table and thereby permits it to be pressed against the table in readiness to enter the next succeeding socket, this mechanism also operating to shift the valve from the position in which fluid under pressure is utilized during the table-rotating movement to the position in which the fluid under pressure is utilized during the operation of the tool-feeding mechanism.

The feeler finger and the mechanism actuated thereby is illustrated in Figs. 6, 9, 12, and 13. The feeler finger comprises a rod 114 which extends through and is slidably mounted in the annular vertical flange 77 which extends upwardly from the upper wall 76 of the base 1. The upper end of this finger desirably is tapered and adapted, during the rotation of the table, to engage a socket preferably in a hardened bushing 115 seated in the rotating table 2. The lower end of the finger 114 is connected by a link to a swinging arm 116 which is pivotally mounted upon a bracket 117 mounted upon and depending from the under face of the upper wall 76 of the base.

The opposite end of the arm 116 is pivotally connected to a link 118, the lower end of which is pivotally connected by a link 119 to one arm 120 of a bell crank lever pivotally mounted upon a shaft 121 in brackets 122 carried by a plate 123 which is supported upon the lower wall of the base 1. Another arm 124 of the bell crank lever, which preferably is forked, is pivotally connected to a bar 125 having a cylindrical portion 126 which is slidably journalled in a bearing 127 of said bracket and is provided with a screw threaded end upon which a shouldered collar 128 is mounted. A spiral spring 129, interposed between the bearing 127 and the shoulder of the sleeve 128, tends to move the bar 125 outwardly, to the right, Fig. 13, thereby rotating the bell crank about its axis in a direction to raise the link 118 and thereby yieldably force the feeler 114 against the under surface of the table 2 so that when the socket of the table comes into registry therewith it will enter said socket.

The opposite end of the bar 125 is pivotally connected to a yoke 130 which is pinned, or otherwise secured, to a piston rod 131 which is slidably mounted in the head 132 of a cylinder 133, said cylinder head having a lateral extension 134 which is secured to the plate 123 by bolts 135 which also serve to secure the supporting bracket of another unit, hereinafter to be described, to the base.

The piston 136, which preferably is hollow, is provided at its outer end with an annular flange 137 which is adapted to abut against the outer end of the cylinder 133 and limit the movement of the piston when acted upon by the spring 129. The piston 136 is moved in opposition to the force of the spring 129 to withdraw the feeler from engagement with the rotating table by fluid pressure which is controlled in a manner hereinafter to be described.

The present invention also includes a mechanism operable by the rotation of the table to restore to normal position the by-pass valve which controls the flow of fluid under pressure and the release of said pressure during the table-rotating and indexing movements. This mechanism, which is illustrated in Figs. 6, 10, 12, and 13, comprises an arm 138, which desirably is provided with a concave face 139 and a beveled rear face 140 adapted to engage the blocks 52 upon the ring of the table-rotating gear and which is keyed to a shaft 141 which extends downwardly through the upper wall 76 of the table and is journalled at its lower end in the stand 123. The arm 138 is pivotally secured to a yoke 142 which is pinned, or otherwise secured, to the end of a cylindrical rod 143 which is reciprocably mounted in a block 144 having oppositely extending trunnions 145 which are mounted in a stand secured to the upper face of the top 76 of the base.

The stand comprises a lower plate 146 and an upper plate 147 which are provided with journals to receive the trunnions 145 of the block 144 and are clamped together and to the base by bolts 148. A spring 149 is interposed between the block 144 and the yoke 142 and tends to force the arm into the path of the blocks 52 upon the table. The opposite end of the rod 143 is provided with an enlarged collar or head 150 which is adapted to engage the block 144 when the spring is extended and to limit the movement of the rod 143 so that the arm will be properly positioned for engagement by the blocks 52 during the rotation of the table.

An arm 151, which is keyed to the shaft 141, see Figs. 12 and 13, is positioned to engage and restore to normal position the by-pass valve which controls the admission of fluid under pressure and the release of such pressure during the rotation and indexing of the table as will hereinafter be more fully described.

The principal object of the present invention is to provide fluid-operated means, preferably hydraulically operated means, for controlling all of the timed operations of the machine including the mechanisms for locking and for releasing the work-supporting mechanism, the mechanisms for indexing the work-supporting mechanisms, the tool-feeding mechanisms, etc., with safety devices operable to prevent any improper actuation of such mechanisms which would interfere with the proper synchronism, or which would cause improper operation of any of the actuating mechanisms.

Any suitable fluid may be utilized in the fluid-operated controlling mechanism, but preferably oil of a proper consistency is employed.

The preferred form of hydraulic controlling mechanism, which is illustrated herein, comprises a series of inter-related control units which for convenience of description and location upon the drawings are designated respectively by the letters A, B, C, D, etc., the various pipes and conduits which establish communication between such units and with other parts of the machine, together with mechanical elements, being designated by numerals.

The controlling units may be mounted in any desirable location. Preferably, however, the majority of such controlling units are housed within the chamber of the base of the machine and may be partially or wholly submerged in the oil contained in the base.

In Fig. 1 the units B, C, D, E, F, and G, are graphically illustrated within the chamber of the base, but in order more clearly to show the connections between, the units are not shown in the positions which they actually assume in the machine in which the units B, C, and D, are mounted upon the plate 123 which is carried by studs which are threaded at their lower ends into the bottom wall of the base with spacers separating the plate 123 from said wall, and are provided at their upper ends with clamping nuts as illustrated in Figs. 12 and 13. The units E and F are also supported mainly from the lower wall of the base in a manner which will hereinafter be more fully described.

*The fluid-actuated controlling mechanism*

The drawings show the parts as positioned during the drilling operation with the table and work-supporting sectors locked in drilling position by hydraulic pressure and the tool-feeding cams in the position in which the tools are approaching the upper limit of their movement after having completed their operations and preparatory to the unlocking of the table and the work supports and the indexing of the rotating table for the next drilling or other operation of the tools.

While the table and work supports are in locked position, as shown in the drawings, the drilling or other operations of the tool are or may be performed at all stations except the loading station at which the operator removes the piece of work,—which has been completed after the successive operations of the tools thereupon during the intermittent rotation of the table,—and substitutes a new piece of work.

When the parts are located as indicated in the drawings, hydraulic pressure is applied to lock the table against rotation, to cause engagement of the clutch members of the tool feeding mechanism and simultaneously to release the brake therefor and to maintain the clutch members of the table-rotating mechanism out of engagement.

Figure 11:
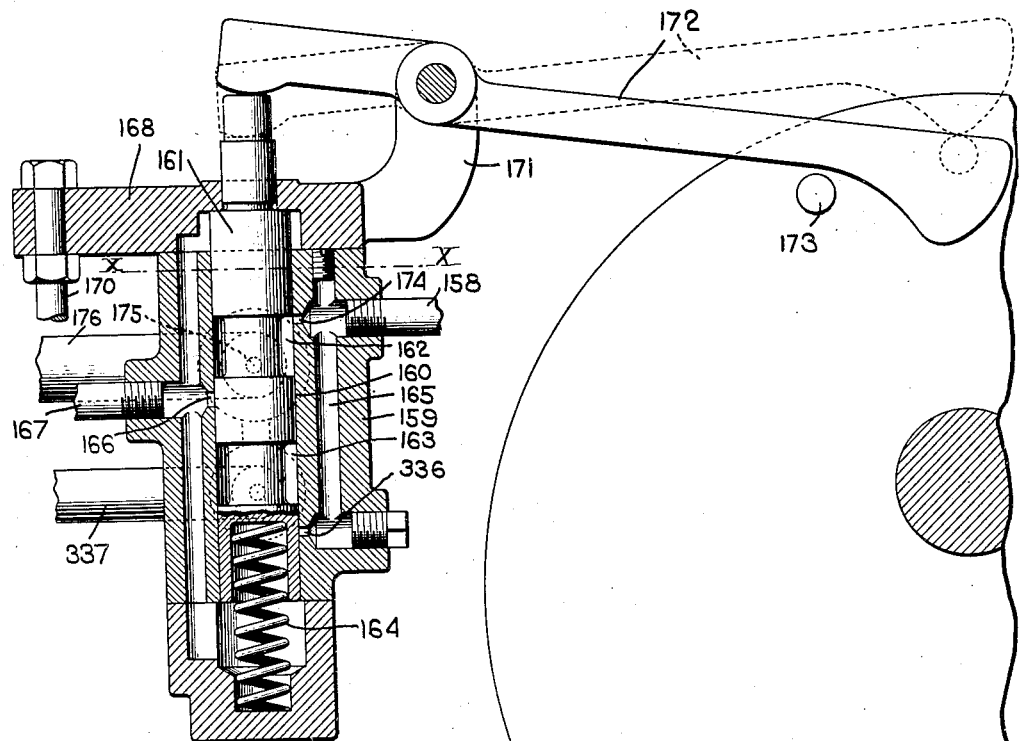
Fig. 11 is an enlarged detail view, mainly in vertical section, of the main control valve and illustrating the manner in which it is operated by the rotation of a tool-feeding cam.
Figure 11A:
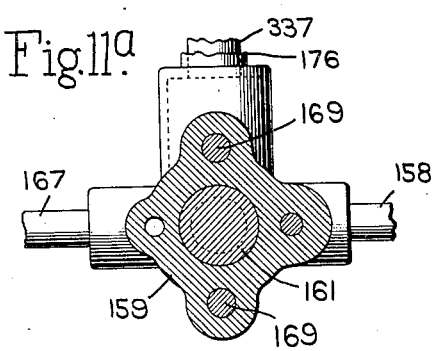
Fig. 11a is a horizontal sectional view on line X—X, Fig. 11.

Under these conditions the course of the fluid is as follows:—Oil is drawn from the chamber of the base 1 through a screen 152 by a pump 153 which is actuated by an electric motor 154, or other suitable means, and forced by the pump through a pipe 155 into a pressure chamber 156 and is also forced through a main pressure line 157 and through certain of the controlling units in the base to maintain the table in locked position and to cause engagement of the feeding mechanism and release of the brake therefrom, and also to the hydraulic means for maintaining disengagement of the clutch of the table-rotating mechanism. It is also forced through a pipe 158 to the chamber of the main control valve, unit A. This unit comprises a casing 159 having a cylindrical valve chamber 160 and a valve 161 having reduced portions forming chambers 162 and 163. The lower end of the valve preferably is hollow and encloses the upper end of a spring 164 which tends to raise the valve, as illustrated in Fig. 11. The pipe 158 communicates with a conduit 165 having restricted ports communicating with the cylinder 160 and so positioned as to communicate alternatively with the chambers 162 and 163 of the piston. The cylinder also is provided with a port 166 leading to an exhaust pipe 167 adapted to return the oil exhausted through it to the chamber of the base 1.

*Main control valve—Unit A*

The unit A comprises a head 168 which is chambered to receive the upper portion of the valve 161 and to provide means for lubricating the valve and is secured to the casing 159 by screws 169, (see Fig. 11—A). The head 168 is supported by a rod or stand 170 upon the bracket which supports the casing for the drill, the feed cam of which actuates the controlling mechanism. The head 168 is provided with laterally extending ears 171 upon which a lever 172 is fulcrumed. One end of the lever 172 engages the stem of the valve 161 while the other end of said lever is provided with a curved or cam faced under surface adapted to be engaged by a pin 173 of the feed-actuating cam 15. The end of the lever 172 desirably is convexedly curved to prevent an abrupt movement of the valve under the action of its spring 164 when the pin 173 passes from beneath the lever during the rotation of the cam.

When the parts are in the position illustrated the fluid flowing through the pipe 158 enters the passage 165 and passes through a restricted port 174 into the chamber 162 of the valve and thence through a restricted port 175 to the pipe 176 which leads to the by-pass valve, unit B, (see Figs. 1 and 12).

*By-pass valve—Unit B*

The by-pass valve B comprises a cylinder 177 which is closed at one end and at the other end is secured by machine screws to the by-pass valve casing 178 which is mounted upon the plate 123. The by-pass valve casing 178 is bored longitudinally in axial alinement with the cylinder and the by-pass valve 179 is reciprocably mounted therein. This by-pass valve is turned down to provide a chambered portion 180 adapted to establish communication through the members of a by-pass conduit and projects at one end beyond the end of the casing sufficiently to to be engaged by the actuating arm 151. The valve 179 has at its opposite end an extension which projects into the cylinder 177 and engages the closed end of a tubular sliding member 181 between which and the valve casing 178 a spiral spring 182 is interposed. Desirably a bushing 183, fitting the valve 179 and extending across the width of the chamber of the cylinder 177, is located between the end of the spring and the valve casing. When fluid under pressure is introduced through the pipe 176 into the cylinder 177 the sliding member 181 is forced laterally (to the left Fig. 12) thereby compressing the spring 182 and extending the end of the valve 179 well beyond the end of the casing, causing its chamber 180 to register with inlet and outlet pipes of the by-pass system.

When the fluid pressure in the pipe 176 is released, the spring 182 forces the sliding member 181 in the opposite direction until a central boss thereupon abuts against the end wall of the cylinder. The movement of the sliding member 181, however, does not move the valve 179 at such time as a spring-pressed plunger 184, engaging the valve 179, retains the valve in the position illustrated until it is moved in the opposite direction by the action of the arm 151.

During the time the table and the work supports are in locked position, and during the operation of the tools, the arm 151, which is secured to the shaft 141, is held out of engagement with the end of the by-pass valve 179 because the arm 138 rests upon one of the blocks 52 upon the ring gear which is connected to the table, as illustrated in Fig. 6. When the main control valve 161, unit A, is depressed by the engagement of the pin 173 of the tool-feeding cam 15 with the lever 172, fluid under pressure is cut off from the pipe 176 and established through the by-pass system to the chamber of the cylinder 137, thereby forcing the piston 136 to the left, Fig. 13, and actuating the bar 125, the rock shaft 121, and arm 120, to withdraw the feeler from its socket in the table as heretofore described.

As the table is rotated, after it is unlocked, the block 52 passes beneath the arm 138 and the arm gradually rides down along the inclined surface 140 by reason of the pressure of the spring 149 upon the arm. Such movement of the arm 138 rocks the shaft 141 and causes the arm 151 to engage the valve 179, and force it endwise, pressure in the pipe 176 having been released at this time.

It may be stated that the function of the fluid under pressure introduced through the pipe 176 into the cylinder 177 of the by-pass unit B, merely serves to position the valve in such a manner as to complete the continuity of the by-pass circuit prior to the passage of fluid through the by-pass circuit to unit C to release the table feeler, as will hereinafter be described. When the main control valve 161 is actuated by the pin 173 on the tool-feeding cam 15, just prior to the arrest of the tool-feeding mechanism, as illustrated in the drawings, fluid pressure is maintained in the cylinder 177 and is also maintained in the pipes leading to the table-locking mechanism and the tool-feeding mechanism. Fluid under pressure is also maintained in the portion of the controlling system which retains the clutch members of the table-feeding mechanism out of operative engagement.

The fluid under pressure, which maintains the table in locked position, the feeding mechanism for the drills in operation, and the clutch members of the table mechanism out of operative engagement, passes through the main pressure line 157 through the chamber 185 of the main admission valve, unit E, thence through the pipe 186 to the main pressure cut-off, unit D, (see Figs. 1 and 14, 12 and 13.)

The unit D comprises a cylinder 187 having a valve 188 reciprocably mounted therein, the valve 188 having a turned-down portion providing a chamber 189 communicating with the pipe 186 when the valve is in the position indicated, (see Fig. 12). The fluid under pressure passes through the valve 189, thence through a pipe 190 to a cylindrical chamber 191 in the main admission valve, unit E.

*Main admission valve unit E and distributor—Unit F*

The main admission valve comprises a casing 192 having at one end the cylindrical chamber 191 in which a cup-shaped piston 193 is reciprocably mounted, and a cylindrical bore of smaller diameter. A piston rod 194, having a screw threaded end portion, engages a central boss upon the piston 193 and has mounted upon it a guide 195 having a hub mounted upon the piston rod 194 and abutting against a shoulder upon an enlarged portion thereof. The guide 195 fits a smaller cylindrical portion of the casing and is spaced from the hub of the piston head by a sleeve 196.

The enlarged portion of the piston rod 194 is provided with a valve 197 adapted to engage a valve seat formed by an internally extending flange 198 of the casing 192. The end of the casing 192 is closed by a hollow screw threaded plug 199 and a helical spring 200, which is seated in the hollow portion of the head 199, abuts against the valve 197 tending to force it toward its valve seat, it being, however, held out of engagement with the valve seat by the fluid under pressure in the chamber 191.

The fluid under pressure entering from the main pressure pipe 157 passes through the chamber 185 into a chamber 201 beyond the valve 197 and passes thence through a pipe 202 to the distributor, unit F. The pipe 202 communicates with a header 203 which is secured to and communicates through an aperture 204 with a chamber 205 of a casing 206 having lateral extensions 207 which are supported by studs 208 seated in the bottom wall of the base 1.

The casing 206 has superimposed upon it a plate 209 having a port 210 communicating with the chamber of a hollow cap forming a distributing chamber 211 superimposed upon the plate 209. The cap and plate are clamped to the casing 206 by bolts 212. The plate 209 is provided with an outlet port 213 which communicates with the distributing chamber and which is normally closed by a valve 214.

The valve 214 is cup-shaped and seats against the under face of the plate 209. It is of larger diameter or area than the port 213 and has a stem 215, the opposite end of which is provided with a spider 216 having a cylindrical peripheral flange 217 which is slidably mounted in the cylindrical valve chamber. The lower end of the valve chamber is closed by a plate 218 which is secured to it by machine screws 219. The plate 218 desirably is provided with a central stud 220 to limit the downward movement of the valve. The spider 216 is apertured as illustrated in Fig. 16. The hollow valve 214 is provided with a central boss which is engaged by the lower end of a spiral spring 221, the upper end of which encircles the reduced end portion 222 of a post 223, the upper end of which is secured by a screw threaded connection with the upper wall of the cap containing the chamber 211.

The upper end of the spring 221 engages a shoulder upon the post 223 and at its lower end engages the valve 214. The spring 221 tends normally to force the valve 214 downwardly, but the valve is normally held in closed position by fluid pressure in a manner about to be described. The upper end of the casing 206 is provided with an annular chamber 224 of considerably larger diameter than the valve 214 and this chamber communicates with preferably two vertical exhaust passages 225 which are open at the lower end to discharge into the lower portion of the chamber of the base of the machine.

The valve 214 is normally held in closed position by fluid under pressure which passes from the pipe 190, (see Figs. 1 and 14) through the pipe 226 into the chamber 227 beneath the valve 214, and through the holes in the spider into the lower portion of the chamber. The pressure thus built up in the chamber 227 forces the valve 214 into its seated position as illustrated. By reason of the fact that the area of the lower face of the valve 214 is greater than the area which is acted upon by the fluid in the distributing chamber 211, the pressure of the fluid in the distributing chamber is overbalanced by the pressure of the valve and the outlet port 213 is maintained closed.

The fluid under pressure passes from the distributing chamber 211 through pipe 228 to each of the table locking mechanisms 4, thereby introducing fluid under pressure into the chamber of the casing 109, thereby forcing downwardly the piston 108 and causing the nose 104 of the plunger 103 to engage the V-shaped grooves 102 of the plates 100 which are secured to the sector, thus forcing the sectors inwardly until the cylindrical inner ends thereof engage the plate 79 and also acting to clamp the sectors 3 firmly upon the rotating table as heretofore described.

The fluid under pressure also passes from the distributing points through suitable pipes and other connections to cause engagement of the clutch of the tool-feeding mechanism and to release the brake thereof, and also to apply fluid under pressure to the mechanism for withdrawing the stop 51 of the rotatable table, and further to supply fluid under pressure to the mechanism for maintaining the clutch members of the table-actuating mechanism out of operative relation.

Separate pipes may extend from the distributing chamber to these mechanisms, or branch pipes may extend from one or more of the pipes 228 which lead to the table-locking mechanism 4. In the particular construction illustrated a pipe 229, (see Fig. 1) which communicates with one of the pipes 228, leads to the retarder, unit G, from which pipes lead respectively to the clutch and brake of the tool feeding mechanism and from which other pipes lead to the hydraulic members of the stop mechanism for the rotating table. The purpose of the retarder or retarders of the unit G is to delay the building up of pressure in the hydraulic mechanism for forcing the clutch members of the tool-feeding mechanism into engagement and for releasing the brake thereof until the locking of the table is completed and also for the purpose of delaying the withdrawal of the stop for the table until the table-locking operation is completed.

*Unit G—Retarder for tool driving control and tool stopping mechanism (Figs. 18 and 19.)*

The pipe 229 communicates with a cylindrical chamber 230 of a central valve casing 231 which has superimposed upon opposite sides thereof valve casings 232 and 233 which are connected together by bolts 234. The chamber 230 is closed by a head or cap 235 which has a central bore 236 in which a spring 237 is seated. The spring 237 engages a shouldered enlargement 238 upon a cylindrical rod 239 which is seated at the end of an axial bore in a valve 240 having a cylindrical body which fits the cylindrical chamber 230 of the valve casing, but is provided with an end portion 241 of smaller diameter which is adapted, when seated, to close a port 242 leading to a pipe 243 which leads to the chambers of the clutch-actuating mechanism and the brake of the tool-feeding mechanism. The port 242 is of relatively small diameter and at its end is further restricted to provide a small port 244 of relatively small effective area which communicates with a passage 245 from which a pipe 246 leads to the cylinder of the stop-withdrawing plunger and also to the dash pot for arresting the rotation of the table.

The retarding unit G is also provided with relief valves to permit a rapid outflow of fluid from these mechanisms when pressure is released.

In the construction illustrated in Fig. 18 the valve 240 has been forced rearwardly against the action of the spring 237 to permit the fluid to flow in the manner above described to the clutch mechanism and brake of the tool feed and to the table-stopping mechanism. Before this can be accomplished, however, fluid pressure must be built up in the chamber 230 to force the valve 240 backward against the pressure of the spring 237, and the pressure of the fluid in the chamber at the same time acts to close the relief valves. A port 247 leads from the chamber 230 through a passage 248 in the casing to a cylindrical chamber 249 in the casing 232 and acts upon a piston valve having a portion 250 which fits the cylinder 249 and is provided with an extension or valve 251 of relatively small diameter which closes a passage 252 leading through the casing 232 and a portion of the casing 231 and which communicates with a passage 253 leading to the pipe 243. The chamber 230 also communicates with a passage 254 which in turn communicates with a passage 255 leading to a cylindrical chamber 256 of the casing 233. This casing is also provided with a valve having a cylindrical portion 257 which fits the cylinder and has an extension or valve 258 which closes a port 259 in the passage 245 with which the pipe 246, leading to the table stop mechanism, communicates.

Springs 260 and 261, interposed between the cylindrical portions 250 and 257 respectively and the ends of the cylindrical chambers 249 and 256 respectively, tend to force the valves away from their seats and exhaust ports 262 and 263 communicate respectively with the chambers in which the valves 251 and 258 are located.

In the operation of the device, therefore, pressure, which is introduced from the pipe 229 into the chamber 230, first passes through the ports 247 and 254 respectively into the chambers 249 and 256, thereby forcing the valves 250 and 257 into closed position against the action of their springs 260 and 261, thus closing the exhaust passages which lead from the pipes 243 and 246 respectively. After the relief valves have thus been closed the piston 240 is forced rearwardly into the position illustrated in Fig. 18, thereby permitting the fluid under pressure to flow through the somewhat restricted passage 242 and pipe 243 to the mechanism for controlling the tool feed and somewhat more slowly through the more restricted passage 244 to the pipe 246 which leads to the table stop mechanism. When fluid pressure in the pipe 243 is relieved at the end of the drilling operation, as will hereinafter be described, the valve 240 will be forced forward by its spring 236, thus cutting off the passage 242 from the chamber 230.

At the same time the relief of pressure in the chamber 230 will permit the springs 260 and 261 of the relief valves to force the relief valves rearwardly, thereby establishing communication, in the one case, from the pipe 243 of the tool-feed controlling mechanism and permititng the fluid to flow through the passages 253 and 252 into the chamber of the relief valve, and thence to escape into the base of the machine through the exhaust port 262, and, in the other case, establishing communication from the pipe 246 with the passages 245 and 259 to the chamber of the relief valve from which it may escape through the port 263.

Figure 2:
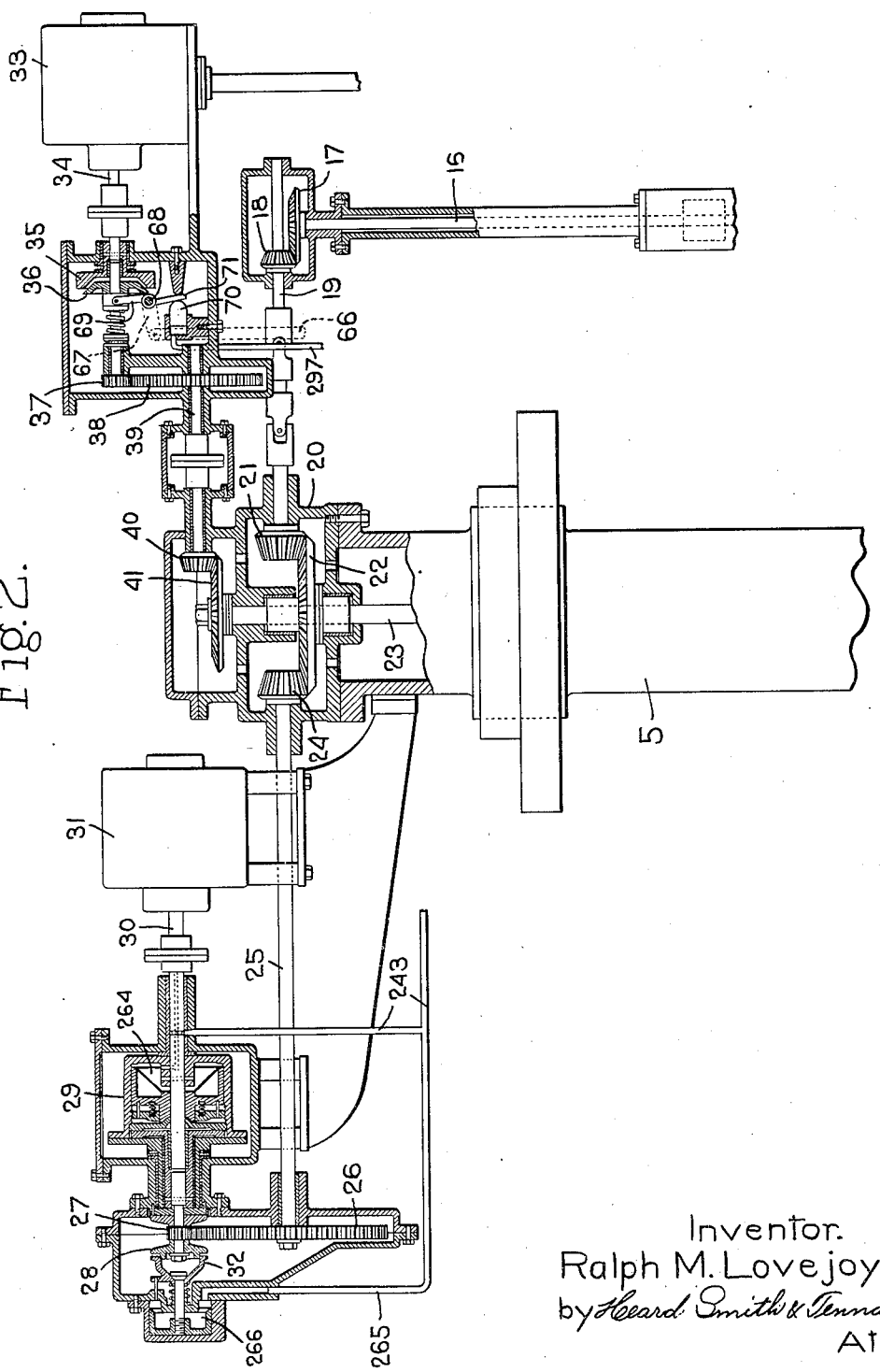
Fig. 2 is a detail view, mainly in vertical section, of the driving mechanism for the tool-feeding mechanism and the driving mechanism for the work-carrier actuating mechanism, with the fluid-operated means for respectively controlling the same.

By reason of this construction, therefore, the action of fluid under pressure upon the tool-feeding mechanism, and also upon the table stop releasing mechanism, is delayed until the complete actuation of the table locking mechanism is insured, but upon release of the pressure of the fluid, which actuates these mechanisms, a prompt exhaust of the fluid from the pipes 243 and 246 is permitted. The pipe 243 leads from the retarding unit G to the chamber 264 of the hydraulic clutch 29 (Fig. 2) and as fluid pressure builds up forces the clutch members into engagement so that power is transmitted from the motor 31 through the shaft 30 and 28 to the gear 27 which, through the gears 26, shaft 25, and gears 24, rotates the ring gear which drives the gears and shafts 19 which actuate the tool-feeding cams in the manner above described.

At the same time fluid under pressure passes from the pipe 243 through a branch pipe 265 to the chamber 266 of the braking mechanism, thereby releasing the brake 32, as heretofore described, and as more fully described in my prior application above mentioned.

The fluid under pressure passes from the retarder G through the pipe 246 to the chamber of the casing 73 of the stop-releasing mechanism, thereby forcing the plunger 72 outwardly into engagement with the arm 74 of the stop 51 and withdrawing the stop from the path of the blocks 52 upon the table gear 49.

A pipe 267 communicates with the chamber of the casing 73, but below the area which is covered by the piston 72 when the latter is in its withdrawn position, (see Fig. 7). The pipe 267 communicates with a pipe 268 which leads to the chamber 59 of the dash pot so that after the plunger 72 has been forced outwardly sufficiently to withdraw the stop 51 from the path of the blocks 52, fluid under pressure will pass through the pipes 267 and 268 into the chamber 59 of the dash pot, thereby establishing fluid pressure in the dash pot, thus forcing the piston 58 thereof outwardly, to the right, as illustrated in Fig. 6, and rocking the stop 51 into the position illustrated in Fig. 6 from the position shown in Fig. 7. Another pipe 269 leads from the pipe 246 to the pipe 268 and is provided with a check valve 270 which prevents flow from the pipe 246 to the pipe 268, but allows flow from the pipe 268 to the pipe 246. The pipe 269 is also provided with a hand-operated valve 271 operable to restrict the flow of fluid through it from the dash pot 59 to the pipe 246 when pressure in the pipe 246 is released.

By reason of this construction the building up of pressure in the chamber 59 of the dash pot is delayed until the plunger 72 has been forced outwardly sufficiently to uncover the port leading to the pipe 267. When the stop 51 is engaged by a block 52 upon the rotating table, it is forced laterally to the left, as shown in Fig. 7, thereby raising the plunger 72 and closing the port leading to the pipe 267, thus trapping fluid under pressure in the dash pot 59. As the stop 51 is moved toward the left by the block 52 of the rotating table, the piston 58 is moved against the pressure of the fluid in the dash pot and forces the fluid through the restricted ports of the valve 271 and the pipe 269 into the pipe 246; thus the dash pot gradually arrests the rotation of the table.

With the parts of the controlling mechanism in the positions illustrated in the drawings, to effect the locking of the table and the operation of the tool feeding mechanism, fluid under pressure is also supplied through other safety mechanisms to the fluid controlled means for maintaining the members of the table-actuating clutch out of engagement. These safety mechanisms are designated as unit H, Figs. 1 and 20, automatic safety valve, and unit I, Figs. 1 and 17, retarder for table drive control.

*Automatic safety valve—Unit H*

The fluid under pressure from the pipe 158 passes through the automatic safety valve H to the retarder for the table drive control I. The unit H comprises a cylinder 272 having reciprocably mounted therein a valve 273 having a central reduced portion providing a valve chamber 274. The valve 273 is provided with a reduced end portion 275 which extends beyond the casing and has secured to it a collar 276 adapted to limit the movement of the valve. A spiral spring 277, located in the countersunk end of the casing and abutting against the collar 276, tends normally to hold the valve in the position indicated in Fig. 20. The valve 273 is provided at its opposite end with an enlarged portion or collar 278 adapted to engage the end of the casing and limit the movement of the valve under the action of its spring. A valve stem 279 extends from the valve into and forms a core of a solenoid 280 which is operable to control the position of the valve 273 upon the completion of a circuit through certain safety mechanisms which will hereinafter be described.

When the valve is in its normal position, as illustrated in Fig. 20, fluid under pressure passing through the pipe 158 is supplied through a relatively small port to the valve chamber 274 and passes from the valve chamber through the pipe 281 to the retarder for the table drive control I.

*Retarder for table drive control—Unit I*

The retarder I comprises a preferably cylindrical casing 282 having a port into the wall of which the pipe 281 is threaded and which communicates with a chamber 283 of an extension of the casing 284 of smaller diameter which forms a valve casing. The chamber 283 is of cylindrical form and has reciprocably mounted therein a valve having a body portion 285 which fits the cylindrical chamber 283 and a reduced extension 286 forming the valve and adapted to engage the flat undersurface of the end wall of the chamber through which a port 287 communicates with the upper chamber of the casing 282.

The end of the valve 286 is provided with a central depression in axial alinement with the port 287 and also with radial grooves 288. The body 285 of the piston is provided with a central recess which contains a spring 289 which abuts at one end against the end of the recess and at the other end extends into a recess in a cap 290 which is secured to the end of the extension 284. As the fluid from the pipe 281 enters the chamber 283, fluid pressure is built up within the chamber which forces the valve 286 away from its seat, thereby permitting fluid under pressure to pass through the port 287 into the chamber 291 of the casing 282. This chamber is of cylindrical form and has reciprocably mounted therein a hollow cylindrical piston 292, the lower end of which is provided with projections 293 which prevent it from seating upon the wall through which the port 287 extends.

A heavy spiral spring 294 is interposed between the head of the piston 292 and a cap 295, which is bolted to the casing 282, and desirably is provided with a central boss 296 extending into the coils of the spring 294 and is provided with a relief port to permit any fluid which accumulates within the hollow piston to escape.

As the fluid passes through the port 287 into the upper chamber of the casing it forces the piston 292 upwardly against the pressure of the spring 294 and passes from this chamber through the pipe 297 to the chamber containing the plunger 70 which engages the arm 71 of the clutch-operating lever 69. Thus, in the normal operation of the machine fluid under pressure, which passes into the chamber containing the plunger 70, forces the plunger outwardly and maintains the clutch member 36 out of engagement with the complementary clutch member 35, thereby preventing actuation of the table mechanism.

When the pressure in the pipe 158 is relieved, as will hereinafter be described, pressure will be relieved in the pipe 281 and the chamber 283 of the retarder so that the valve 285 will seat against the under face of the wall, thereby permitting the fluid to flow from the chamber 291 and port 287 only through the grooves 288, thus restricting the flow of fluid from the chamber of the plunger 70.

Furthermore, at this time the extension of the spring 294 will force the piston 292 downwardly, thereby substantially maintaining the pressure in the chamber of the plunger 72 for a considerable time, thus further delaying the period at which the plunger 70 may be forced backwardly by the mechanism for causing engagement of the clutch members 35 and 36, thereby insuring ample time for the by-passing of the fluid to cause proper actuation of the elements of other units of the controlling mechanism.

In order to prevent premature actuation of the table-feeding mechanism, or improper operation of other parts of the controlling mechanism before the tools have been completely removed from the work, electrically operated safety mechanism is provided for controlling the solenoid-actuated valve 273 of the unit H. This safety mechanism comprises the inclusion in the electric circuit of the solenoid of switches, lying in the path of movement of each of the tool carriers, which must be closed before the circuit of the solenoid is completed, and also preferably includes a manually controlled device which must be properly set to complete the circuit before the solenoid can be completed to permit the release of fluid under pressure from the chamber of the plunger 70 and the engagement thereafter of the clutch members 35 and 36 of the table-rotating mechanism.

The switches for thus automatically completing the electric circuit when the tool carriages have reached the upper limit of their movement, are illustrated in Fig. 1 and graphically in Figs. 5, 20, and 21. As shown in Fig. 20, an electric current is supplied to the solenoid from a suitable source 298 which, while illustrated as a battery, may be derived from a generator or a usual power line, and which passes therefrom through the conductor 299 through the coil of the solenoid 280, thence through the conductor 300 to a terminal 301 of a switch, which may be mounted upon a suitable block of insulation 302 secured to the bracket 10 which supports the tool carrier. A co-operating flexible switch member or terminal 303 is also mounted in the insulated block 300 and lies in the path of an arm 304 upon the head of the tool carrier 12, or any other convenient portion of the tool slide.

When the tool has been raised to the upper limit of its movement, the switch terminal 303 will be caused to engage the switch member 301, thus completing the continuity of the conductor 300. As one of these switches is mounted upon the support for each tool carrier, it follows that all of the switches must be closed before the circuit from the source of electrical energy to the solenoid is completed to permit energization of the solenoid. It, therefore, follows that if for any reason any tool carrier fails to be raised to its predetermined height, actuation of the valve 273 by the solenoid is prevented and pressure is maintained in the chamber of the plunger 70 so that the clutch members 35 and 36 will be maintained out of engagement.

*Manual safety switch—Unit J*

The manually operable safety switch, unit J, which is illustrated in detail in Fig. 21, comprises a casing 305 which may be mounted upon the machine in any position in proximity to the loading station within the convenient reach of the operator. The casing 305 is provided with a cylindrical chamber 306 in which a piston 307 is reciprocably mounted. The piston head, which slidably fits within the cylindrical chamber 306, desirably is hollow and has a reduced section 308 providing a shoulder. A spiral spring 309, surrounding the section 308 of the piston and interposed between the shoulder of the piston head and the end wall of the chamber, tends normally to force the piston to the right, Fig. 21. An extension 310 of the piston extends through the end of the casing and is adapted to engage and release the member of a switch as will hereinafter be described. The other end of the chamber 306 is closed by a head 311 which is suitably secured to it by machine bolts. Fluid under pressure may be supplied to the chamber 306 from any of the pipes 228 which lead from the chamber 211 of the distributor, (see Figs. 1, 14, and 15.)

The casing 305 is provided with a pair of upwardly extending curved arms 312 which overhang the end of the casing through which the piston extension 310 projects. A plate 313 is connected to the arms 312 and has mounted upon it insulating blocks 314 and 315 which are secured together and to the plate 313 by bolts 316 which pass through insulating sleeves 317 in apertures in the plate 313. The electric conductor 300 is connected to a plate 318 which is electrically connected by the bolts 316 to the resilient switch members 319 which are spaced apart at their ends and are adapted to be engaged by a complementary switch member 320 connected to the return conductor 321 leading to the generator 298. The switch member 320 is mounted upon a swinging arm 322, but electrically insulated therefrom by insulation 323. The swinging arm 322 is pivoted upon a rod 324 which is mounted in the overhanging arms 312. Desirably the arm 322 is L-shaped and is provided with a bore or chamber 325 in axial alinement with the pivot 324. A plunger 326 is reciprocably mounted in the chamber 325 and is normally forced outwardly by a spring 327 interposed between the end of the plunger and the end wall of the chamber. The extent of movement of the plunger 326 is limited by a pin 328 on the plunger 326 which extends into a slot 329 in the arm 322. When pressure is relieved in the chamber 306 the piston 308 is forced inwardly, to the right, Fig. 21, by the spring 309, so that its extension 310 passes from beneath the end of the plunger 326 thereby permitting the plunger 326 to be extended into the path of the plunger 310. When fluid pressure is introduced into the chamber 306 concurrently with the introduction of pressure into the table-locking mechanism and the clutch of the tool-feeding mechanism, the piston 307 is moved outwardly, to the left, to the position shown, thereby swinging the arm 322, to the left, Fig. 21, and disengaging the switch member 320 from the complementary switch members 319.

The swinging movement of the plunger may be limited by a rod or pin 330 projecting from one or both of the arms 312 into the path of the arm.

A bell crank lever comprising a handle 331 is mounted upon a pin 332 in the extension 333 of L-shaped arm. The other arm 334 of the bell crank extends beneath the pin 328 thereby enabling the pin to be raised upwardly as the handle 331 is swung to the right, Fig. 21. Such movement of the handle also serves to swing the arm 322 about its axis to cause engagement of the switch member 320 with the switch members 319. When the switch members are thus engaged, as illustrated in Fig. 21, and all of the switch members 301 and 303 are closed by the tool carriers, upon reaching the upward limit of their movement, the circuit of the solenoid will be completed and the solenoid then energized will move the valve from the position illustrated in Fig. 20, to the right, thereby cutting off the supply of fluid under pressure through the pipe 158 and releasing pressure from the pipe 281 through the chamber 274 to a discharge pipe 335 which may communicate with the pipe 243 which communicates with the unit G, Fig. 18. from which it is discharged through the passages 253, 252, and outlet port 262 as heretofore described. Before this can occur, however, the main control valve 161 of unit A must be operated by engagement of the pin 173 of the cam 15 with the lever 172 of unit A, see Figs. 1 and 11.

After the completion of the drilling or other operations of the tool, continued rotation of the tool-feeding cam permits the tool carriers to be raised. As the tool carriers approach their predetermined upward limit of movement the pin 173 on the cam 15 engages the lever 172 of the main control valve, unit A, and raises it to the dotted line position illustrated in Fig. 11, thereby depressing the valve 161, thus closing the port 174 through which fluid under pressure is admitted to the chamber 162 and the pipe 176, and at the same time establishing communication between the pipe 176 and the exhaust pipe 167, thus relieving the pressure in the pipe 176. The pipe 176 communicates with the chamber of the casing 177 unit B, see Fig. 12, and the relief of pressure in said chamber permits the spring 182 to force the piston 181 outwardly, thereby withdrawing it from engagement with the valve 179. Such movement of the piston 181, however, does not move the valve 179 as the piston is not connected to it and the valve is retained in the position illustrated by the spring-pressed plunger 184 until the valve is shifted by the movement of the arm 151 upon the shaft 141 through the actuation of the arm 138 of the shaft 141 by the spring 149, Figs. 6 and 10, when the block 52 passes out of engagement with the arm 138. As before stated, the valve 179 is, therefore, merely positioned by the pressure in the cylinder 177 for subsequent actuation by the arm 151.

The downward movement of the piston 161 of unit A, Fig. 11, permits the fluid under pressure to pass from the fluid pressure supply pipe 158 through the passage 165 and the port 336 into the chamber 163 of the valve 161, and thence through the pipe 337 into the chamber 180 of the valve 179 of unit B, Fig. 12, from which it passes through the pipe 338 to the chamber 339 of unit C, Fig. 13, thereby forcing the piston 136 outwardly to the left, Fig. 13, thus drawing the bar 125 to the left and acting through the arm 124 of the rock shaft 121 to swing down its arm 120, thus drawing down the link 118 and the arm 116 and withdrawing the feeler 114 from its socket in the rotating table. The rock shaft 121 has also secured to it an arm 340 which is connected by a pair of links 341 to an extension 342 of the main pressure cut-off valve, unit D, (Figs. 12 and 13). This movement, therefore, of the bar 125 draws the main cut-off valve 188 outwardly, to the right, Fig. 13, thereby closing the port through which the fluid under pressure enters the chamber 189 of the unit D and uncovering an exhaust port 343 in the wall of the casing 187, thus permitting the exhaust of fluid under pressure from the pipe 190 which controls the main admission valve, unit E, and the valve of the distributor F, through the pipe 226 which branches from the pipe 190.

The release of fluid under pressure from the pipe 190 relieves the pressure in the chamber 191 of the main admission valve, unit E, Fig. 14, thereby permitting the spring 200 to force the valve to the right, Fig. 14, thus seating the valve 197 upon the valve seat 198 and cutting off the supply of fluid under pressure from the pressure pipe 157 to the chamber 197 and the pipe 202 which leads to the distributor unit F. At the same time the exhaust of fluid from the pipe 190 also exhausts the fluid in the branch pipe 226 which leads to the chamber 227, see Figs. 15 and 16, thereby reducing the pressure in said chamber and permitting the spring 221 to force the valve 214 downwardly, thereby establishing communication between the distributing chamber 211 and the chamber 224, so that the fluid under pressure is permitted to flow from the distributing chamber 211 through the exhaust ports 225 into the reservoir of the base of the machine. The escape of fluid under pressure from the distributing chamber also permits the exhaust of fluid from the various pipes 228 which lead to the chambers of the work support and table locking mechanisms, thereby releasing the same, so that the table is free to rotate.

At the same time, pressure is released in the pipe 229 which leads from one of the pipes 228 to the retarder for the tool drive control and table stopping mechanism, unit G. Such exhaust of fluid from the pipe 229 releases the pressure in the chamber 230 of the retarder for the tool drive control, unit G, and also releases the pressure in the chambers 249 and 256 of the valves 250 and 257 respectively, thereby permitting the springs 260 and 261 to open the valves 250 and 257, thereby permitting liquid to discharge from the pipe 243 through the passages 253, 252 and 262 into the reservoir of the base of the machine, and also permitting the fluid to discharge from the pipe 246 through the passages 245 and 259 and exhaust port 263 into the reservoir.

The pipe 243 leads from the retarder for the tool drive control to the chamber 264 of the clutch of the tool feeding mechanism, so that the clutch members of the tool feeding drive wil be released by the action of their spring as described in my previous application. At the same time the release of pressure in the chamber 266 of the brake mechanism permits the brake-actuating spring to force the brake 32 into engagement with its co-operating member upon the end of the shaft 28, thereby quickly arresting the rotation of the mechanism which actuates the tool-feeding cams.

The pipe 246 leads from the retarder, unit G, to the table stopping mechanism and the release of pressure in this pipe, 246, see Fig. 6, permits the plunger 72 to be raised by the movement of the stop 51 under the action of its spring 55, thereby positioning the stop 51 in the path of the next block 52 upon the ring gear of the table. The raising of the plunger 72 cuts off the port leading from the chamber of the plunger casing 73 to the pipe 267 which communicates through the pipe 268 with the dash pot, thereby trapping fluid under pressure in the dash pot, so that upon the next engagement of the stop 51 by a block 52 of the rotating table will gradually arrest the rotative movement of the table, as heretofore described.

The parts of the controlling mechanism are now positioned preparatory to the rotative movement of the table.

Operation of the machine

During the operation of the tools and while the table is in locked position, the operator removes the finished work from the work plate and substitutes a new piece to be operated upon, and moves the handle 331 inwardly, thereby causing the arm 334 of the rock shaft 322 to raise the plunger 326 sufficiently to pass over the end of the extension 310 of the piston rod and causes the contact member 320 to engage the contact members 319, thus completing the circuit of the solenoid at this point. The mechanisms are then positioned as illustrated in the drawings with the tool supports moving upwardly out of work.

When the tool-feeding cam 15 has rotated sufficiently to cause its pin 173 to engage the lever 172, unit A, and actuate the main control valve 161, fluid under pressure from the supply pipe 158 is cut off, and the chamber 162 of said valve is caused to establish communication between the pipe 176 which leads to the by-pass valve, unit B, and establish communication between the pipe 176 and the exhaust pipe 167, which discharges the exhausted fluid into the reservoir in the base of the machine. The release of pressure from the chamber 177 of the by-pass valve, while permitting the piston 181 to move outwardly, does not, however, affect the positioned by-pass valve 179. The movement of the valve 161 also permits the supply pipe 158 to communicate through the passage 165 and the port 336, and valve chamber 163, with the pipe 337 which leads to the chamber 180 of the by-pass valve, unit B, Fig. 12. Fluid under pressure then passes through the chamber 180 of the by-pass valve and pipe 338 to the chamber 339 of the table feeler control and cut-off, unit C, Figs. 12 and 13. The pressure, which is built up in the chamber 339, thereupon forces the piston 136, Fig. 13, to the left, thereby drawing the bar 125 to the left, and acting through the bell crank arm 124, rock shaft 121, and arm 120, draws downwardly the link 118 of the table feeler, thereby removing the table feeler 114 from its socket in the table. This movement of the rock shaft at the same time moves the rock shaft arm 340 to the right, Fig. 13, thereby moving the main pressure cut-off valve 188, unit D. Fig. 13, to the right, thus cutting off the supply of pressure through the pipe 186 to the chamber 189 of the main pressure cut-off and establishing communication between the pipe 190 and the exhaust port 343.

The exhaust of fluid from the pipe 190, which leads to the chamber 191 of the main admission valve, permits the main admission valve to be closed by the action of its spring 200, thereby cutting off the supply of fluid under pressure through the pipe 202 to the distributor, unit F. At the same time the release of pressure in the pipe 190 releases pressure in the pipe 226, which holds the valve 214 of the distributor in closed position, thereby permitting the spring 221, (Fig. 16) to force the valve 214 downwardly, thus establishing communication through the chamber 224 with the exhaust ports 225 which discharge into the reservoir in the base of the machine. The release of fluid under pressure from the chamber 211 of the distributor also releases pressure upon the fluid under pressure in the pipes 228, thereby releasing the locking mechanisms for the various work-supporting sectors, and also releasing pressure in the pipe 246, Fig. 6, of the mechanism for restoring the stop to normal position, and also releasing pressure in the pipe 243 and branch pipe 265 which lead respectively to the clutch and brake of the tool-feeding mechanism, thereby permitting the release of the clutch and the application of the brake, thus arresting the tool-feeding mechanism. At the same time the release of pressure in the pipe 228, which leads to the chamber 306 of the manual safety switch, unit J, Fig. 21, permits the spring 309 to force the plunger 308 to the right, withdrawing the extension 310 from beneath the plunger 326, so that the plunger 326 is extended by its spring 327 into the path of the extension 310. By reason of this operation, therefore, the table is unlocked preparatory to rotation and the tool-feeding mechanism is arrested. Prior, however, to the arrest of the tool-feeding mechanism, the cam 15 will have rotated sufficiently to permit the tool supports to reach the upper limit of their movements.

When all of the reciprocating tool supports have reached the predetermined upper limit of their movement, at the end of the predetermined time required for the completion of the drilling operation and the withdrawal of the tools from the work, the switch members 303 and 301 will have been brought into contact, thus completing the continuity of the conductor 299, solenoid 280, and conductor 300, and as the switch member 320 has been placed by the operator in engagement with the complementary switch members 319 the circuit through the solenoid of the automatic safety valve, unit H, is completed through the conductor 321.

The energization of the solenoid 280 then moves the valve 273 to the right from the position indicated in Fig. 20, thereby closing the port leading from the fluid pressure pipe 158 to the valve chamber 274 and causing the valve chamber 274 to establish communication between the pipe 281 and the exhaust pipe 335 which discharges into the pipe 243. As the pipe 281 leads from the chamber of the automatic safety valve to the retarder for the table drive control, unit I, pressure will be relieved in the chamber 283 of the table valve control so that fluid can escape gradually through the port 287 and grooves 288 from the chamber 291, thereby permitting the fluid gradually to escape from the pipe 297 which leads to the chamber behind the plunger 70 which retains the clutch members out of engagement, so that the spring 69 will gradually force the clutch member 36 against the clutch member 35 of the table driving mechanism.

When engagement of these clutch members is established the table driving motor 33 will cause the rotation of the train of gears 37 and 38, shaft 39, beveled gears 40 and 41, thereby rotating the table driving shaft 23, and through the train of gears 42, 43, shaft 44, gears 45 and 46 and 48, and cause the rotation of the ring gear 49 which is secured to the table, thus rotating the table until the next block 52 upon the table engages the stop 51. When such engagement occurs the action of the dash pot 59 will gradually arrest the rotation of the table.

During the rotation of the table the arm 138 will ride off of the block 52, see Fig. 6, and the spring 149 will force the arm 138 inwardly, toward the table, thereby rocking the shaft 141 and causing the arm 151 on the opposite end of said shaft, see Fig. 12, to engage the valve 179 and force it to the right, thus cutting off the supply of by-passed fluid under pressure through the pipe 337, and the chamber 180 to the pipe 338 leading to the chamber 339 of the table feeler control unit C, and establishing exhaust communication from the pipe 338 to the exhaust port 344 in the valve casing 178. The escape of fluid under pressure from the pipe 338 and chamber 339 of the table feeler control, unit C, permits the spring 129 to move the bar 125 to the right, Fig. 13, thereby forcing the arm 124 of the rock shaft 121 to the right and raising the arm 120, the link 118, and arm 116 upwardly so that the table feeler 114 will be forced against the under surface of the table.

So long as the feeler 114 engages the under surface of the table without entering the socket in the bushing 115, the rock shaft 121 cannot be rotated sufficiently by the spring 129 to cause its arm 340 to move the valve 188 sufficiently to cut off the exhaust 343 from the chamber 189 of the main pressure cut-off, unit B. As the table approaches the proper indexed position a block 52 upon the table gear engages the stop 51 and forces it laterally, to the left, Fig. 6, as above described, thereby moving the piston 58 of the dash pot against the pressure within it and gradually arresting the rotation of the table. This movement of the piston of the dash pot causes the piston extension 60 to actuate the rock shaft 63 in a direction to draw down the link 66 and thus moves the arm 67 of the bell crank lever in a direction to cause its yoke 69 to disengage the clutch of the table-actuating mechanism.

When the feeler 114 enters the socket in the bushing 115 in the table, the spring 129, Fig. 13, rotates the rock shaft 121 and thereby forces the piston 188 to the left to normal position illustrated in Fig. 13, thereby establishing communication between the pipe 186 and the pipe 190 which lead respectively to the chamber of the main admission valve, unit E, and also through the branch pipe 226 to the valve chamber of the distributor, unit F, thereby actuating these valves and establishing the fluid pressure circuit to the table-locking mechanism and through the retarder, unit G, to the clutch of the tool-feeding mechanism and to the table-stopping mechanism to re-position the same, as illustrated in Fig. 6.

*The safety mechanisms*

From the above description of the construction and operation of the controlling mechanism, it will be apparent that as soon as the operator has properly secured a new piece of work to the work support of the rotating table at the loading station he may actuate the lever 331 and then, if desired, leave the machine. Upon the completion of the operation of the tools and the withdrawal of all of the tools from the work to their upper predetermined limit, the table-turning operation will be initiated providing, however, that if any tool fails to reach said predetermined upper limit of movement the circuit of the solenoid will not be completed and the operation of the table-rotating mechanism will be prevented.

If the circuit through the solenoid is properly completed the engagement of the pin 173 of the tool cam 15 will cause the actuation of the main control valve, unit A, to cut off the supply of pressure from the pipe 158 to the table-locking mechanism and the tool-feeding mechanism and establish communication between the fluid pressure pipe 158 and the by-pass pipe 337 to unlock the table, to release the clutch of the tool-feeding mechanism and to apply the brake to the shaft of the tool-feeding mechanism.

While at this time the solenoid will have moved the automatic safety valve, unit H, to a position to release pressure in the retarder for the table drive control, unit I, the action of the retarder will delay the engagement of the clutch members of the tool-feeding mechanism sufficiently to permit the fluid pressure thus by-passed to complete the unlocking of the table, the withdrawal of the feeler from its socket in the table and the release of pressure upon the clutch of the tool-feeding mechanism and brake.

The table will then be rotated until the next block 52 upon the ring gear of the table engages the table stop 51 and causes the gradual arrest thereof by the dash pot. In the meantime, the feeler will have engaged the under face of the table and unless the table is rotated sufficiently to cause the feeler to enter a socket in the table the main pressure cut-off, unit D, will be prevented from moving sufficiently to transmit fluid pressure from the pipe 186 through the pipe 190 through which fluid under pressure is transmitted to the main admission valve and to the valve of the distributor. The table-locking mechanism cannot, therefore, be effected until the table is properly indexed to enable the table feeler to enter its socket in the table thereby insuring proper indexing of the table.

When the table is properly indexed so that the feeler enters its socket in the table, the main admission valve, unit E, and the valve of the distributor F, are actuated by the fluid pressure of the pipe 190 and its branch pipe 226, thereby establishing fluid pressure through the pipe 228 to the various table-locking mechanisms.

When such pressure is established in the pipes 228 the passage of the fluid through the retarder G of the tool drive control and the table stopping mechanism is sufficiently delayed to insure the completion of the table-locking mechanism before the operation of the drill can be started, on the one hand, and before fluid pressure can be built up in the chamber 73 of the stop-releasing plunger 72, thus insuring completion of the actuation by the piston 60 of the dash pot of the table-stopping mechanism and the rock shaft 63 and link 66 to disengage the clutch members of the table-feeding mechanism.

At the same time the building up of pressure through the pipe 228, which leads to the manual safety switch, unit J, causes the plunger of the safety switch to be forced outwardly so that its engagement with the extended plunger 326 of the arm 322 will swing the arm 322 outwardly, thereby breaking the circuit of the solenoid so that the table-feeding mechanism cannot again be actuated until the operator, by forcing the handle 331 inwardly, completes the electric circuit of the solenoid. It will thus be seen that safety means are provided for positively preventing any improper operation of the machine.

While the controlling mechanism in the particular embodiment of the invention illustrated herein has been described particularly with reference to the use of a liquid, such as oil, it will be obvious that other fluids, such as water, air under pressure, steam, or a gaseous fluid, may be utilized, and further that the sequence of operations of the mechanisms herein described may be accomplished by the employment of suitable electrically operated mechanisms and, therefore, that the term "fluid" is used herein in a broad sense as descriptive of any medium which is capable of transmission through a conductor to actuate suitable mechanisms to accomplish the purposes herein described.

It will also be understood that the particular mechanisms which are disclosed herein are illustrative and not restrictive and that other mechanisms and other arrangement of parts may be employed to effect the functions thereof and to perform the sequence of operations herein set forth within the meaning and scope of the following claims.

Having thus described the invention, what is claimed as new, and desired to be secured by Letters Patent, is:

1. In a machine of the class described comprising a travelling work carrier, means for actuating said carrier to present the work successively at a plurality of stations, tools at certain of said stations, fluid-operated means for locking the carrier with the work positioned at said stations, tool-feeding means, means including fluid-operated means for causing the actuation of said tool-feeding means, means for supplying fluid under pressure, means for conducting said fluid under pressure to the respective fluid-operated means, a main control valve therefor selectively operable to control the supply of fluid under pressure to the respective fluid-operated means or to by-pass said fluid under pressure, and means operable by the pressure of the by-passed fluid to release the fluid pressure upon the respective fluid-operated means.

2. In a machine of the class described comprising a travelling work carrier, means for actuating said carrier to present the work successively at a plurality of stations, tools at certain of said stations, fluid-operated means for locking the carrier with the work positioned at said stations, tool-feeding means, means including fluid-operated means for causing the actuation of said tool-feeding means, means for supplying fluid under pressure, means for conducting said fluid under pressure to the respective fluid-operated means, a main control valve therefor selectively operable to control the supply of fluid under pressure to the respective fluid-operated means or to by-pass said fluid under pressure, means operable by the pressure of the by-passed fluid to release the fluid pressure upon the respective fluid-operated means, and means for retarding the flow of fluid under pressure to the means for causing the actuation of the tool-feeding means operable to delay the action thereof until the completion of the locking of said carrier.

3. In a machine of the class described comprising a travelling work carrier, means for actuating said carrier to present the work successively at a plurality of stations, tools at certain of said stations, a yieldable stop operable gradually to arrest said carrier and to position the work at said stations, fluid-operated means for locking the carrier when arrested, fluid-operated means for releasing and restoring said stop to operative position, means for supplying fluid under pressure, means for conducting the fluid under pressure to the respective fluid-operated means, a main control valve therefor selectively operable to control the supply of fluid under pressure to the respective fluid-operated means, or to by-pass said fluid under pressure, means operable by the by-passed fluid under pressure to release the fluid pressure upon the respective fluid-operated means, and means for retarding the flow of fluid under pressure to the stop-releasing and restoring means operable to delay the action thereof until the completion of the locking of said carrier.

4. In a machine of the class described comprising a travelling work carrier, means for actuating said carrier to present the work successively at a plurality of stations, tools at certain of said stations, a yieldable stop operable gradually to arrest said carrier and to position the work at said stations, fluid-operated means for locking the carrier when arrested, fluid-operated means for releasing and restoring said stop to operative position, tool-feeding means, fluid-operated means for causing the actuation of said tool-feeding means, means for supplying fluid under pressure, means for conducting the fluid under pressure to the respective fluid-operated means, a main control valve therefor selectively operable to control the supply of fluid under pressure to the respective fluid-operated means, or to by-pass said fluid under pressure, means operable by the by-passed fluid under pressure to release the fluid pressure upon the respective fluid-operated means, means for retarding the flow of fluid under pressure to the stop-releasing and restoring means operable to delay the action thereof until the completion of the locking of said carrier, and means for retarding the flow of fluid under pressure to the means for causing the actuation of the tool-feeding means operable to delay the action thereof until said completion of the locking of said carrier.

5. In a machine of the class described comprising a travelling work carrier, means for actuating said carrier to present the work successively at a plurality of stations, tools at certain of said stations, yieldable stop mechanism including a dash pot operable gradually to arrest said carrier and to position the work at said stations, fluid-operated means for locking the carrier when arrested, fluid-operated means for releasing and restoring said stop to operative position, means operable upon actuation of said stop-releasing and restoring means to supply fluid under pressure to said dash pot, means for supplying fluid under pressure, means for conducting the fluid under pressure to the respective fluid-operated means, a main control valve therefor selectively operable to control the supply of fluid under pressure to the respective fluid-operated means, or to by-pass said fluid under pressure, means operable by the by-passed fluid under pressure to release the fluid pressure upon the respective fluid-operated means, and means for retarding the flow of fluid under pressure to the stop-releasing and restoring means operable to delay the action thereof until the completion of the locking of said carrier.

6. In a machine of the class described comprising a travelling work carrier, means for actuating said carrier to present the work successively at a plurality of stations, tools at certain of said stations, a yieldable stop operable gradually to arrest said carrier with the work positioned at said stations, means operable by the yielding movement of said stop to render said carrier-actuating means inoperative, fluid-operated means for maintaining said carrier-actuating means inoperative, fluid-operated means for locking the carrier when arrested, means for supplying fluid under pressure, means for conducting the fluid under pressure to the respective fluid-operated means, a main control valve therefor selectively operable to control the supply of fluid under pressure to the respective fluid-operated means, or to by-pass said fluid under pressure, means operable by the by-passed fluid under pressure to release the fluid pressure upon the respective fluid-operated means, and means for retarding the release of fluid pressure from the means for maintaining the carrier-actuating means inoperative until the completion of the locking of said carrier.

7. In a machine of the class described comprising a travelling work carrier, means for actuating said carrier to present the work successively at a plurality of stations, tools at certain of said stations, a yieldable stop operable gradually to arrest said carrier with the work positioned at said stations, means operable by the yielding movement of said stop to render said carrier-actuating means inoperative, fluid-operated means for maintaining said carrier-actuating means inoperative, fluid-operated means for locking the carrier when arrested, fluid-operated means for releasing and restoring said stop to operative position, means for supplying fluid under pressure, means for conducting the fluid under pressure to the respective fluid-operated means, a main control valve therefor selectively operable to control the supply of fluid under pressure to the respective fluid-operated means, or to by-pass said fluid under pressure, means operable by the by-passed fluid under pressure to release the fluid under pressure upon the respective fluid-operated means, means for retarding the flow of fluid under pressure to the stop-releasing and restoring means to delay the action thereof until the completion of the locking of the carrier, and means for retarding the release of fluid pressure upon the means for maintaining the carrier-actuating means inoperative until the completion of the locking of said carrier.

8. In a machine of the class described comprising a travelling work carrier, means for actuating said carrier to present the work successively at a plurality of stations, tools at certain of said stations, a yieldable stop operable gradually to arrest said carrier with the work positioned at said stations, fluid-operated means for locking said carrier, means operable by the yielding movement of said stop to render said carrier-actuating means inoperative, fluid-operated means for maintaining said carrier-actuating means inoperative, means for supplying fluid under pressure, means for conducting the fluid under pressure to the respective fluid-operated means, a main control valve therefor normally positioned to cause fluid under pressure to be supplied to the respective fluid-operated means, means operable by the movement of a tool-feeding means when the tools have been withdrawn a predetermined distance from the work to cause said valve to by-pass said fluid, and means operable by the by-passed fluid under pressure to release the fluid pressure upon the respective fluid-operated means and thereby to permit actuation of the carrier.

9. In a machine of the class described comprising a travelling work carrier, means for actuating said carrier to present the work successively at a plurality of stations, tools at certain of said stations, a yieldable stop operable gradually to arrest said carrier with the work positioned at said stations, fluid-operated means for locking said carrier, means operable by the yielding move-ment of said stop to render said carrier-actuating means inoperative, fluid-operated means for maintaining said carrier-actuating means inoperative, means for supplying fluid under pressure, means for conducting the fluid under pressure to the respective fluid-operated means, a main control valve therefor normally positioned to cause fluid under pressure to be supplied to the respective fluid-operated means, means operable by the movement of a tool-feeding means when the tools have been withdrawn a predetermined distance from the work to cause said valve to by-pass said fluid, means operable by the by-passed fluid under pressure to release the fluid pressure upon the respective fluid-operated means and thereby to permit actuation of the carrier, and means for retarding the release of pressure from the means for maintaining the carrier-actuating means inoperative until the completion of the release of fluid pressure from the carrier-locking means.

10. In a machine of the class described comprising a travelling work carrier, means for actuating said carrier to present the work successively at a plurality of stations, tool carriers at certain of said stations, means for feeding said tool carriers to and from the work, means for arresting said carrier with the work positioned at said stations, means operable by said carrier-arresting means to render said carrier-actuating means inoperative, fluid-pressure operated means for locking said carrier when arrested, means for supplying fluid under pressure, means for conducting the fluid under pressure to the respective fluid-operated means, a main control valve therefor normally positioned to cause fluid under pressure to be supplied to the respective fluid-operated means, means automatically operable when the tools have been withdrawn a predetermined distance from the work to cause said valve to by-pass the fluid, means operable by the by-passed fluid under pressure to release the fluid under pressure upon the respective fluid-operated means thereby to unlock the work carrier and to permit actuation thereof, and means operable to prevent the release of pressure from the means for maintaining the carrier-actuating means inoperative unless each of said tools has been withdrawn a predetermined distance from the work.

11. In a machine of the class described comprising a travelling work carrier, means for actuating said carrier to present the work successively at a plurality of stations, tool carriers at certain of said stations, means for feeding said tool carriers to and from the work, means for arresting said carrier with the work positioned at said stations, fluid-operated means operable by said carrier-arresting means to render said carrier-actuating means inoperative, fluid-pressure operated means for locking said carrier when arrested, means for supplying fluid under pressure, means for conducting the fluid under pressure to the respective fluid-operated means, a main control valve therefor normally positioned to cause fluid under pressure to be supplied to the respective fluid-operated means, means automatically operable when the tools have been withdrawn a predetermined distance from the work to cause said valve to by-pass the fluid, means operable by the by-passed fluid under pressure to release the fluid under pressure upon the respective fluid-operated means thereby to unlock the work carrier and to permit actuation thereof, an electric circuit having normally open switches movable to closed position respectively upon movement of the respective tools a predetermined distance from the work, and means operable only upon the completion of said electric circuit to permit release of the fluid pressure maintaining the carrier-actuating means inoperative.

12. In a machine of the class described comprising a travelling work carrier, means for actuating said carrier to present the work successively at a plurality of stations, tool carriers at certain of said stations, means for feeding said tool carriers to and from the work, means for arresting said carrier with the work positioned at said stations, fluid-operated means operable by said carrier-arresting means to render said carrier-actuating means inoperative, fluid-pressure operated means for locking said carrier when arrested, means for supplying fluid under pressure, means for conducting the fluid under pressure to the respective fluid-operated means, a main control valve therefor normally positioned to cause fluid under pressure to be supplied to the respective fluid-operated means, means automatically operable when the tools have been withdrawn a predetermined distance from the work to cause said valve to by-pass the fluid, means operable by the by-passed fluid under pressure to release the fluid under pressure upon the respective fluid-operated means thereby to unlock the work carrier and to permit actuation thereof, an electric circuit having normally open switches movable to closed position respectively upon movement of the respective tools a predetermined distance from the work, means operable only upon the completion of said electric circuit to permit release of the fluid pressure maintaining the carrier-actuating means inoperative, and a manually operable switch in said circuit.

13. In a machine of the class described comprising a travelling work carrier, means for actuating said carrier to present the work successively at a plurality of stations, tool carriers at said stations, means for feeding said tool carriers to and from the work, means for arresting said carrier with the work positioned at said stations, means operable by said carrier-arresting means to render said carrier-actuating means inoperative, fluid-pressure operated means for locking said carrier when arrested, means for supplying fluid under pressure, means for conducting the fluid under pressure to the respective fluid-operated means, a main control valve therefor normally positioned to cause fluid under pressure to be supplied to the respective fluid-operated means, means automatically operable when the tools have been withdrawn a predetermined distance from the work to cause said valve to by-pass the fluid, means operable by the by-passed fluid under pressure to release the fluid under pressure upon the respective fluid-operated means thereby to unlock the work carrier and to permit actuation thereof, fluid-pressure operated means operable to maintain the carrier-actuating means inoperative, an electric circuit having switches operable respectively upon movement of the respective tools a predetermined distance from the work, means operable only upon the completion of said electric circuit to permit release of the fluid pressure maintaining the carrier-actuating means inoperative, a manually operable switch in said circuit, and means operable upon admission of fluid under pressure in said fluid-operated carrier-locking means to open said switch and to maintain the same in open position during the application of fluid pressure to said pressure-operated means.

14. In a machine of the class described comprising a travelling work carrier, means for actuating said carrier to present the work successively at a plurality of stations, tool carriers at said stations, means for feeding said tool carriers to and from the work, means for arresting said carrier with the work positioned at said stations, means operable by said carrier-arresting means to render said carrier-actuating means inoperative, fluid-pressure operated means for locking said carrier when arrested, means for supplying fluid under pressure, means for conducting the fluid under pressure to the respective fluid-operated means, a main control valve therefor normally positioned to cause fluid under pressure to be supplied to the respective fluid-operated means, means automatically operable when the tools have been withdrawn a predetermined distance from the work to cause said valve to by-pass the fluid, means operable by the by-passed fluid under pressure to release the fluid under pressure upon the respective fluid-operated means thereby to unlock the work carrier and to permit actuation thereof, fluid-pressure operated means operable to maintain the carrier-actuating means inoperative, an electric circuit having switches operable respectively upon movement of the respective tools a predetermined distance from the work, means operable only upon the completion of said electric circuit to permit release of the fluid pressure maintaining the carrier-actuating means inoperative, a manually operable switch in said circuit, means operable upon admission of fluid under pressure in said fluid-operated carrier-locking means to open said switch and to maintain the same in open position during the application of fluid pressure to said pressure-operated means, and means operable to permit manual closing of said switch before the release of pressure in said fluid-pressure operated means.

15. In a machine of the class described comprising a travelling work carrier, means for actuating said carrier to present the work successively at a plurality of stations, tools at certain of said stations, means for arresting the carrier with the work positioned at said stations, fluid-operated means for locking said carrier when arrested, tool-feeding means, fluid-operated means for causing the actuation of said tool-feeding means, a distributor for fluid under pressure, means for conducting said fluid to said respective fluid-operated means, means for supplying fluid under pressure, a main conduit leading therefrom to said distributor, a fluid-controlled main admission valve in said main conduit, a branch conduit for supplying fluid under pressure to actuate said main admission valve, a main control valve in said branch conduit selectively operable to supply fluid under pressure to said main admission valve or to release pressure therefrom and to by-pass the fluid under pressure supplied through said branch conduit, and means operable by the by-pass fluid to release the fluid under pressure upon the respective fluid-operated means.

16. In a machine of the class described comprising a travelling work carrier, means for actuating said carrier to present the work successively at a plurality of stations, tools at certain of said stations, means for arresting the carrier with the work positioned at said stations, fluid-operated means for locking said carrier when arrested, tool-feeding means, fluid-operated means for causing the actuation of said tool-feeding means, a distributor for fluid under pressure, means for conducting said fluid to said respective fluid-operated means, means for supplying fluid under pressure, a main conduit leading therefrom to said distributor, a fluid-controlled main admission valve in said main conduit, a branch conduit for supplying fluid under pressure to actuate said main admission valve, a main control valve in said branch conduit normally positioned to supply fluid under pressure to said main admission valve and by actuation of the same to supply fluid under pressure to said distributor, and means operable by a tool-feeding means, when the tools have been withdrawn from the work, to release the fluid pressure in said branch conduit and to by-pass the fluid under pressure supplied through said branch conduit, and means operable by the by-passed fluid to release the fluid under pressure upon said fluid-operated means.

17. In a machine of the class described comprising a travelling work carrier, means for actuating said carrier to present the work successively at a plurality of stations, tools at certain of said stations, means for arresting the carrier with the work positioned at said stations, fluid-operated means for locking said carrier when arrested, a yieldable stop operable gradually to arrest said carrier with the work positioned at said stations, fluid-operated means for locking said carrier when arrested, fluid-operated means for releasing and restoring said stop to operative position, tool-feeding means, fluid-operated means for causing the actuation of said tool-feeding means, a distributor for fluid under pressure, means for conducting said fluid to said respective fluid-operated means, means for supplying fluid under pressure, a main conduit leading therefrom to said distributor, a fluid-controlled main admission valve in said main conduit, a branch conduit for supplying fluid under pressure to actuate said main admission valve, a main control valve in said branch conduit selectively operable to supply fluid under pressure to said main admission valve or to release pressure therefrom and to by-pass the fluid under pressure supplied through said branch conduit, and means operable by the by-passed fluid to release the fluid under pressure upon the respective fluid-operated means.

18. In a machine of the class described comprising a travelling work carrier, means for actuating said carrier to present the work successively at a plurality of stations, tools at certain of said stations, a yieldable stop operable gradually to arrest said carrier with the work positioned at said stations, fluid-operated means for locking said carrier when arrested, means operable by the yielding movement of said stop to render said carrier-actuating means inoperative, fluid-operated means, for causing the actuation of said tool-feeding means, a distributor for fluid under pressure, means for conducting said fluid to the respective fluid-operated means, means for supplying fluid under pressure, a main conduit leading therefrom to said distributor, a fluid-controlled main admission valve in said conduit, a branch conduit for supplying fluid under pressure to actuate said main admission valve, a main control valve in said branch conduit normally positioned to cause fluid under pressure to actuate said main admission valve, means operable by said tool-feeding means to release the pressure upon said main admission valve and to by-pass the fluid under pressure supplied through said branch conduit, means operable by the by-passed fluid to release the fluid under pressure upon the aforesaid fluid-operated means, fluid pressure means for maintaining said carrier-actuating means inoperative during the actuation of said tool-feeding means, means for supplying fluid under pressure to said fluid-operated means, means operable only when the tools have been withdrawn a predetermined distance from the work to release the fluid pressure upon the means for rendering the carrier-actuating means inoperative.

19. In a machine of the class described comprising a travelling work carrier, means for actuating said carrier to present the work successively at a plurality of stations, tools at certain of said stations, a yieldable stop operable gradually to arrest said carrier with the work positioned at said stations, fluid-operated means for locking said carrier when arrested, means operable by the yielding movement of said stop to render said carrier-actuating means inoperative, fluid-operated means for causing the actuation of said tool-feeding means, a distributor for fluid under pressure, means for conducting said fluid to the respective fluid-operated means, means for supplying fluid under pressure, a main conduit leading therefrom to said distributor, a fluid-controlled main admission valve in said conduit, a branch conduit for supplying fluid under pressure to actuate said main admission valve, a main control valve in said branch conduit normally positioned to cause fluid under pressure to actuate said main admission valve, means operable by said tool-feeding means to release the pressure upon said main admission valve and to by-pass the fluid under pressure supplied through said branch conduit, means operable by the by-passed fluid to release the fluid under pressure upon the aforesaid fluid-operated means, fluid pressure means for maintaining said carrier-actuating means inoperative during the actuation of said tool-feeding means, means for supplying fluid under pressure to said fluid-operated means, means operable only when the tools have been withdrawn a predetermined distance from the work to release the fluid pressure upon the means for rendering the carrier-actuating means inoperative, and retarding means operable to delay the operation of the carrier-actuating means until the completion of the release of pressure from the carrier-locking means.

20. In a machine of the class described comprising a travelling work carrier, means for actuating said carrier to present the work successively at a plurality of tool stations, means for arresting said travelling carrier operable during the arresting movement to render said carrier-actuating means inoperative, means for locking the carrier, fluid-actuated means for maintaining said carrier inoperative, tools at certain of said stations, tool-feeding means, means operable by said tool-feeding means upon withdrawal of the tools from said work to unlock said carrier and to release the fluid under pressure maintaining the carrier-actuating means inoperative, retarding means for delaying escape of fluid under pressure therefrom and supplemental means for temporarily building up pressure in said retarding means during the escape of such fluid operable to insure completion of the unlocking of the carrier before initiation of movement of the travelling carrier.

21. In a machine of the class described comprising a travelling work carrier, means for actuating said carrier to present the work successively at a plurality of tool stations, means operable to lock the work carrier with the work presented at said stations, feeler-engaging means on said work carrier, a feeler, means for forcing the feeler into the path of said feeler-engaging means, means for withdrawing the feeler from said feeler-engaging means and retaining the same out of engagement therewith during the initial movement of the work carrier, means operable by the withdrawal of the feeler from said feeler-engaging means to release said carrier-locking means, and means operable during the movement of the work carrier to permit restoration of the feeler into the path of the feeler-engaging means.

22. In a machine of the class described comprising a travelling work carrier, means for actuating said carrier to present the work successively at a plurality of tool stations, fluid-operated means operable to lock the work carrier with the work presented at said stations, feeler-engaging means on said work carrier, a feeler, means for forcing the feeler into the path of said feeler-engaging means, means for withdrawing the feeler from said feeler-engaging means and retaining the same out of engagement therewith during the initial movement of the work carrier, means operable during the movement of the work carrier to permit restoration of the feeler into the path of the feeler-engaging means, and means operable by said feeler during engagement with said feeler-engaging means to supply fluid under pressure to said locking means.

23. In a machine of the class described comprising a travelling work carrier, means for actuating said carrier to present the work successively at a plurality of tool stations, fluid-operated means for locking said carrier with the work positioned at said stations, means for supplying fluid under pressure to said carrier-locking means, a feeler, co-operating means upon said carrier adapted to be engaged by said feeler only when the work is properly positioned at the respective tool stations, and means for controlling the supply of fluid under pressure to said locking means including a valve so positioned by the movement of said feeler when engaging said co-operating means as to cause fluid under pressure to be supplied to said carrier-locking means.

24. In a machine of the class described comprising a travelling work carrier, means for actuating said carrier to present the work successively at a plurality of tool stations, fluid-operated means for locking said carrier with the work positioned at said stations, means for supplying fluid under pressure to said carrier-locking means, a feeler, means for forcing said feeler into engagement with said carrier, feeler-receiving means upon said carrier adapted to be engaged by said feeler only when the work is positioned at the respective tool stations, and means for controlling the supply of fluid under pressure to said locking means including a valve so positioned by the movement of said feeler when engaging said feeler-receiving means as to cause fluid under pressure to be supplied to said carrier-locking means, fluid-actuated means operable to withdraw said feeler from said carrier and to release the fluid pressure of said locking means, and means operable to supply fluid under pressure to said feeler-withdrawing means only after all the tools have been fully withdrawn from the work.

25. In a machine of the class described comprising a travelling work carrier, means for actuating said carrier to present the work successively at a plurality of tool stations, tool carriers at certain of said stations, means for simultaneously feeding all the tool carriers to the work, means for supplying fluid under pressure, means operable respectively by said fluid under pressure to lock the work carrier to maintain the carrier-actuating means inoperative and to cause actuation of said tool-feeding means, means controlling the supply of fluid under pressure to said locking means operable only when the tools are all fully withdrawn from the work to release the fluid pressure from said locking means and tool-feeding means and to cause the actuation of said carrier, means for arresting the carrier, a feeler engaging said carrier and operable thereby at the end of the indexing operation to prevent said fluid-operated means from locking said work carrier unless the work is approximately properly positioned at the tool stations.

26. In a machine of the class described comprising a travelling work carrier, means for actuating said carrier to present the work successively at a plurality of tool stations, tool carriers at certain of said stations, means for moving said tool carriers to and from the work, fluid-operated means for locking said carrier with the work positioned at said stations, means for supplying fluid under pressure to said carrier-locking means, a feeler, means for forcing said feeler into engagement with said carrier, feeler-receiving means upon said carrier adapted to be engaged by said feeler only when the work is positioned at the respective tool stations, means for controlling the supply of fluid under pressure to said locking means including a main cut-off valve so positioned by the movement of said feeler when engaging said feeler-receiving means as to cause fluid under pressure to be supplied to said carrier-locking means, fluid-actuated means for withdrawing said feeler from said feeler-receiving means, and for positioning said main cut-off valve to release fluid pressure on said locking means, means for supplying fluid under pressure, feeler-withdrawing means comprising a main control valve and means for positioning said main control valve to supply fluid under pressure to said feeler-withdrawing means only when all the tools are fully withdrawn from the work.

27. In a machine of the class described comprising a travelling work carrier, means for actuating said carrier to present the work successively at a plurality of tool stations, tool carriers at certain of said stations, means for moving said tool carriers to and from the work, fluid-operated means for locking said carrier with the work positioned at said stations, means for supplying fluid under pressure to said carrier-locking means, a spring-actuated feeler, feeler-receiving means upon said carrier adapted to be engaged by said feeler only when the work is properly positioned at the respective tool stations, means for controlling the supply of fluid under pressure to said locking means including a main cut-off valve so positioned by the movement of said feeler when engaging said feeler-receiving means as to cause fluid under pressure to be supplied to said carrier-locking means, fluid-actuated means for withdrawing said feeler from said feeler-receiving means, and for positioning said main cut-off valve to release fluid pressure on said locking means, means for supplying fluid under pressure, feeler-withdrawing means comprising a main control valve and means for positioning said main control valve to supply fluid under pressure to said feeler-withdrawing means only when all the tools are fully withdrawn from the work, a by-pass valve intermediate of said main control valve and said fluid-actuated means for withdrawing said feeler, fluid-controlled means for causing the actuation of said travelling work carrier after the feeler has been withdrawn, and means operable during the indexing movement of said work carrier to position said by-pass valve to cut off the supply of fluid under pressure to the means for withdrawing the feeler and to release the fluid pressure upon said feeler-withdrawing means.

28. In a machine of the class described comprising a travelling work carrier, means for actuating said carrier to present the work successively at a plurality of tool stations, tool carriers at certain of said stations, means for moving said tool carriers to and from the work, fluid-operated means for locking said carrier with the work positioned at said stations, means for supplying fluid under pressure to said carrier-locking means, a spring-actuated feeler, feeler-receiving means upon said carrier adapted to be engaged by said feeler only when the work is properly positioned at the respective tool stations, means for controlling the supply of fluid under pressure to said locking means including a main cut-off valve so positioned by the movement of said feeler when engaging said feeler-receiving means as to cause fluid under pressure to be supplied to said carrier-locking means, fluid-actuated means for withdrawing said feeler from said feeler-receiving means, and for positioning said main cut-off valve to release fluid pressure on said locking means, means for supplying fluid under pressure, feeler-withdrawing means comprising a main control valve, and a by-pass valve intermediate of said main control valve and said main cut-off valve, means for positioning said main cut-off valve to supply fluid under pressure through said by-pass valve to said feeler-withdrawing means, thereby to withdraw said feeler and to cause said main cut-off valve to release the fluid pressure upon said carrier-locking means..

29. In a machine of the class described comprising a travelling work carrier, means for actuating said carrier to present the work successively at a plurality of tool stations, tool carriers at certain of said stations, means for moving said tool carriers to and from the work fluid-operated means for locking said carrier with the work positioned at said stations, means for supplying fluid under pressure to said carrier-locking means, a spring-actuated feeler, feeler-receiving means upon said carrier adapted to be engaged by said feeler only when the work is properly positioned at the respective tool stations, means for controlling the supply of fluid under pressure to said locking means including a main cut-off valve so positioned by the movement of said feeler when engaging said feeler-receiving means as to cause fluid under pressure to be supplied to said carrier-locking means, fluid-actuated means for withdrawing said feeler from said feeler-receiving means, and for positioning said main cut-off valve to release fluid pressure on said locking means, means for supplying fluid under pressure, feeler-withdrawing means comprising a main control valve, and a by-pass valve intermediate of said main control valve and said main cut-off valve, means for positioning said main cut-off valve to supply fluid under pressure through said by-pass valve to said feeler-withdrawing means, thereby to withdraw said feeler and to cause said main cut-off valve to release the fluid pressure upon said carrier-locking means, fluid-operated means for causing the actuation of said travelling work carrier after the feeler has been withdrawn from said feeler-receiving means and after the release of said carrier-locking means, and means operable by the movement of said carrier to cause said by-pass valve to cut off the supply of fluid under pressure to said feeler-withdrawing means and to release the fluid pressure therefrom.

30. In a machine of the class described comprising a travelling work carrier, means for indexing the same to present the work at a plurality of tool stations, tool carriers at certain of said tool stations, means for feeding the tool carriers to and from the work, means for controlling said indexing means to cause automatic indexing thereof at predetermined periods in the operation of said machine including a manually operable means normally positioned to render said controlling means inoperative, but adapted to be set during the operation of the tools upon the work to render said controlling means operative.

31. In a machine of the class described comprising a travelling work carrier, means for indexing the same to present the work at a plurality of tool stations, tool carriers at certain of said tool stations, means for feeding the tool carriers to and from the work, means for controlling said indexing means to cause automatic indexing thereof at predetermined periods in the operation of said machine including a manually operable means normally positioned to render said controlling means inoperative, but adapted to be set during the operation of the tools upon the work to render said controlling means operative, and means operable upon the indexing movement of the carrier to restore said manually operable means to inoperative position.

32. In a machine of the class described comprising a travelling work carrier, means for indexing the carrier to present the work successively at a plurality of tool stations, tool carriers at certain of said stations, means for feeding the tools to and from the work, means for controlling the actuation of said indexing means comprising an electric circuit having a plurality of normally open switches adapted to be closed by the movement of the respective tools when the same have been withdrawn predetermined distances from the work, said circuit also including a normally open manually operable switch adapted to be closed by the operator during said feeding movement of said tool carriers and thereby to enable the completion of the controlling circuit upon withdrawal of all the tools from the work and to cause automatic indexing of the work carrier.

33. In a machine of the class described comprising a travelling work carrier, means for indexing said carrier to present the work successively at a plurality of tool stations, tool carriers at certain of said stations, means for feeding said tool carriers to and from the work, means for locking said carrier with the work positioned at said station, fluid pressure operated means for releasing said locking means and for causing the actuation of said indexing means including an electrically controlled valve normally positioned to supply fluid under pressure to said locking means during the actuation of said tool carriers, means for actuating said valve to release the fluid under pressure supplied to said locking means and to cause the actuation of said indexing means including an electric circuit having a plurality of normally open switches adapted to be closed by the movement of the respective tools when the same has been withdrawn predetermined distances from the work, said circuit also including a normally open manually operable switch adapted to be closed by the operator during the feeding movement of said tool carriers, and thereby to enable the completion of the circuit upon withdrawal of all the tools from the work and to cause the automatic indexing of the work carrier.

In testimony whereof, I have signed my name to this specification.

RALPH M. LOVEJOY.